United States Patent [19]
Kleinerman

[11] Patent Number: 6,041,365
[45] Date of Patent: *Mar. 21, 2000

[54] APPARATUS AND METHOD FOR HIGH PERFORMANCE REMOTE APPLICATION GATEWAY SERVERS

[76] Inventor: Aurel Kleinerman, 307 Waverly St. #5, Menlo Park, Calif. 94025

[*] Notice: This patent is subject to a terminal disclaimer.

[21] Appl. No.: 08/885,141

[22] Filed: Jun. 30, 1997

Related U.S. Application Data

[63] Continuation-in-part of application No. 08/542,863, Oct. 13, 1995, Pat. No. 5,734,871, which is a continuation of application No. 08/406,638, Mar. 20, 1995, abandoned, which is a continuation of application No. 08/261,764, Jun. 17, 1994, abandoned, which is a continuation of application No. 08/089,947, Jul. 12, 1993, abandoned, which is a continuation of application No. 07/549,889, Jul. 9, 1990, Pat. No. 5,228,137, which is a continuation-in-part of application No. 07/145,692, Jan. 15, 1988, abandoned, which is a continuation of application No. 06/792,424, Oct. 29, 1985, abandoned.

[51] Int. Cl.[7] ................................................... G06F 15/00
[52] U.S. Cl. ............................................................ 709/302
[58] Field of Search ....................... 707/103; 395/200.15, 395/500; 709/228, 235, 229, 231, 226, 302

[56] References Cited

U.S. PATENT DOCUMENTS

| | | | |
|---|---|---|---|
| 5,680,551 | 10/1997 | Martino, II | 395/200.56 |
| 5,745,901 | 4/1998 | Entner et al. | 707/103 |
| 5,790,809 | 8/1998 | Holmes | 395/200.58 |
| 5,822,521 | 10/1998 | Gartner et al. | 395/200.6 |
| 5,828,842 | 10/1998 | Sugauchi et al. | 395/200.53 |

*Primary Examiner*—Albert De Cady
*Assistant Examiner*—Jason Greene
*Attorney, Agent, or Firm*—Walter J. Madden

[57] ABSTRACT

A method of simultaneously executing one or more computer application programs in one or more host computer system or server system under the control of a second computer system, where the host computer system or server system generates either presentation information or generic computer messages, or both, based on the application programs, involves establishing selected parameters in the host computer presentation information or messages, or both, interpreting selected portions of the host computer system's presentation information or message information, or both, as input to a computer program resident in the second computer system, examining the host computer system presentation information or message information, or both, at the second computer system to detect the presence therein of one or more of the selected parameters utilizing information in a custom object database, and continuing operation of the second computer system during the examining for the selected parameters.

30 Claims, 26 Drawing Sheets

Applications A-1 & A-2 use messaging system A.
Applications B-1 & B-2 use messaging system B.

Applications A-1 & B-1 may communicate since the gateway converts a message of type A to message of type B and inversely.

APPARATUS AND METHOD FOR HIGH PERFORMANCE REMOTE APPLICATION GATEWAY SERVERS

CROSS-REFERENCE TO RELATED APPLICATIONS

This application is a continuation-in-part of Ser. No. 08/542,863, filed Oct. 13, 1995, U.S. Pat. No. 5,734,871; which is a continuation of application Ser. No. 08/406,638, filed Mar. 20, 1995, abandoned; which is a continuation of application Ser. No. 08/261,764, filed Jun. 17, 1994, abandoned; which is a continuation of application Ser. No. 08/089,947, filed Jul. 12, 1993, abandoned; which is a continuation of application Ser. No. 07/549,889, filed Jul. 9, 1990, now U.S. Pat. No. 5,228,137, which is a continuation-in-part of application Ser. No. 07/145,692, filed Jan. 15, 1988, abandoned; which is a continuation of application Ser. No. 06/792,424, filed Oct. 29, 1985, abandoned.

BACKGROUND

1. Field of the Invention

This invention relates to improved systems and methods for controlling the execution of one or more computer application programs on one or more host computers under the control of a second computer, without changes to any of the pre-existing host application programs.

2. Description of the Prior Art

Since the early days of digital computers, the problem of asynchronous distributed computing has proven difficult to solve in spite of many attempts. In 1978, C.A.R. Hoare of The Queen's University of Belfast, Northern Ireland, in a paper titled "Communicating Sequential Processes", attributes the difficulty of building such distributed applications to the complexity of programming nondeterministic systems. The coding complexity of such problems, although well known in academic circles, remains to this day largely unrecognized in the computing industry at large. Presently, most of the tools and enabling technologies provided to address the problem of distributed computing do not even recognize this as an issue.

On the other hand, synchronous distributed systems do not have to address the problem of non-determinism, and therefore are less complex to build. Such systems do not, however, live up to the expectations of distributed computing in terms of performance, ease of use or maintenance costs. For this reason there continues to be a succession of new products introduced more or less continuously which claim to provide a practical solution to asynchronous distributed applications. Many such products, although introduced by very large and experienced corporations having large marketing capabilities, such as IBM's SAA architecture and relational DBMS client/servers, DEC's X-windows, OSF's foundations ORB architecture, and others, by failing to address the problem of non-determinism, have achieved only limited success. More recently, a new class of products characterized as "three tier middleware", such as CORBA (Common Object Request Broker Architecture) from OMG and DCOM from Microsoft, claims to provide a practical solution to the problem, but fails to take into account that such products increase the level of complexity, since they introduce non-determinism at both sides of the middleware.

By definition, middleware products act as intermediary between different resources in a computer system. Originally, the concept of middleware was applied to network integration, providing network access between similar (bridges) or different (gateways) networks. For example, a network gateway acts as an intermediary between two different networks such that neither network needs to be modified in order to operate jointly. FIG. 1 shows the functions of a network between client functions and server functions.

Proliferation of different software applications that provide similar services but which exist on different computer systems, e.g. electronic mail systems such as PROFSs (Professional Office System), and Office Vision on IBM systems, All-in-One on DEC mainframes, and Microsoft Mail on Windows systems) has created the problem of how to integrate such applications into a single system. The obvious solution was to extend the concept of middleware from integrating networks to the integration of applications software.

However, this turned out to be very difficult to do in the absence of a program interface. Unlike a user interface, which allows a human to access the services of a computer program, a programmatic interface permits one computer program to request the services of another computer program. As a result, many computer programs are now offered with such an interface, commonly called an API (Application Program Interface). Some such APIs have become "standards", but many more are used by only one such application. For example, X.400 and X.500 are "standard" APIs for electronic mail systems, while Apple's OCE and Microsoft's Mail interface are examples of proprietary interfaces.

The recent proliferation of APIs, from Internet's APIs such as HyperText Transfer Protocol (HTTP), Hyper Text Markup Language (HTML) and MIME, to Client/Server APIs such as SQL, ODBC, and up to mainframe APIs such as APPC, X.500 and others, has made the integration of computer applications even more involved than it was before their introduction. In order to accommodate these various APIs, middleware products have become more and more complex. Unlike the evolution of network protocols, which has seen a convergence over time to a limited number of standards such as Ethernet, Token Ring, TCP/IP, IPX and SNA, the growth of APIs continues due to the increase in complexity of computer applications services. This proliferation and evolution of APIs is reflected in a corresponding proliferation and evolution of middleware products.

Most middleware products today provide solutions for a limited set of such APIs depending on the market need and opportunity. For example, there are middleware products that convert SQL requests to CICS transactions only, and middleware products that convert HTPP transactions to ODBC requests only. The rapid growth in computer services applications, which is reflected in the rapid development of APIs, has often made such middleware products obsolete even before the integration projects have been completed.

Middleware is positioned between different components and resources of a computer system that communicate with each other. As the minimum, middleware must be able to receive and transmit messages and to act as a message dispatcher. Middleware products that do not modify messages are called bridges: M/Q middleware from IBM, and DEC message Q are examples of such products. Most such bridges provide routing capabilities, message queuing and monitoring, guaranteed deliveries, etc., between dissimilar computer systems and networks. However, the applications components sending and receiving messages in this environment must use the same messaging system. FIG. 7 shows the manner in which an application bridge manages messages by queuing and redirecting them from one system to another without any changes to any message. In this model, the Application A-1 may communicate with Application A-2, but not with Applications B-1 or B-2, which happen to use a different communication system. FIG. 8 differentiates an application gateway from an application bridge of FIG. 7 by its ability to interpret and translate messages from one messaging system to another, which results in the ability of Applications A-1 and A-2 to communicate with Applications B-1 and B-2 without requiring changes to any of these applications.

Most known middleware products support a tightly coupled model for distributed systems. Such a model requires that all parts of a distributed system be developed using a pre-defined communication system or API. As result, any changes to any module require modifications to other modules, and changes to the communication system (API) may require extensive changes to all modules. Recent products, such as Entera from Open Environment Corp. (OEC), OMG's CORBA, Sun's RMI and Microsoft's DCOM, exemplify this model by proposing a "standard" for building distributed applications.

Typically, each such "standard" is incompatible with the others, and applications developed under any such "standard" will be unable to communicate with any application not using it. The backbone of such a system is usually a middleware product developed to carry out the "standard". Each module relies on the middleware to provide a variety of services, from connectivity, to message routing, data encryption, etc. This variety of services is more typically associated with an operating system than a middleware product. As a result, applications developed under such a system are very dependent on the middleware and therefore even more insulated from integration with the services of other systems.

The aim of such bridging middleware strategy is to permit integration of various hardware components, such as mainframes from IBM, minicomputers from DEC, servers from HP and workstations from SUN, under a single system. This strategy, however, precludes integration of various software applications developed under different systems.

U.S. Pat. No. 5,228,137, ("the '137 patent") on which the present application is based and which is incorporated herein by reference, teaches, inter alia, a method of re-establishing determinism for a developer attempting to construct a computer program that integrates one or more remote computer programs which are running in remote host systems. The '137 patent describes how, by using an intermediary layer of software, generically called middleware, a developer may build a computer program that synchronously controls the execution of one or more remote programs in a deterministic fashion. The middleware in this case functions to restore the determinism by resolving the problems of non-determinism.

The '137 patent also discloses a method for controlling the execution or one or more remote computer applications programs under the control of a second computer system. Implicit to the system of that patent, as shown in FIG. 2, is a software apparatus, commonly called a framework, which implements most of this method and as a result of its use, reduces the work required by a user to complete the process of remotely and simultaneously controlling other computer applictions programs residing in one or more different host computers.

SUMMARY OF THE PRESENT INVENTION

The present invention utilizes the teachings of the '137 patent in the construction and use of a type of software generically called a Remote Application Gateway Server (RAGS), as shown in FIG. 3, which may or may not require direct interaction with a human. Such an application gateway server provides the ability to bridge one or more existing remote or local applications (Client(s)) to one or more existing remote host applications (Servers) without having to modify either the local applications or the remote ones.

For example, one may create such a bridge to connect Microsoft Excel—a local existing application—to a remote accounting package on an IBM 30xx system under a MVS operating system, and a customer order application under a VAX system—both acting as servers. Neither of these applications were designed to work together under any topology.

FIG. 4 illustrates the generic situation of networks acting as either a bridge or a gateway between a plurality of remote host systems and a client application operating through MitemView in accordance with this invention. FIG. 5 shows a RAGS of the present invention functioning between a plurality of remote host systems and a plurality of client workstations.

As an example of remote bridging of dissimilar applications, this invention provides a method for receiving, transmitting and interpreting HTTP and HTML messages. This method, when added to a RAGS framework, provides a simple yet extremely powerful method for integrating Internet/Intranet applications, such as WEB Browsers (Netscape Navigator, Microsoft Explorer, etc.), with one or more remote computer programs residing on one or more host computers, without the need for modifications to such applications.

This last example shows how the same method and framework may be used to control the execution of remote computer applications that do not have a user interface, but were designed to communicate with other application programs by using either generic or proprietary messages.

The present invention addresses the problem of uncontrolled proliferation of various APIs and dedicated middleware products. Instead of providing another middleware product, presented herein is a framework and method for rapid development of high performing and highly reliable dedicated middleware products as needed by users for their integration projects. Instead of having to acquire another middleware product for each project, users of this invention may use the framework and method to build dedicated middleware products that satisfy all their needs.

To be commercially attractive, the invention addresses the issues of cost, functionality, performance, maintenance and reliability. Users may customize the framework and method in order to achieve the desired goals. The resulting product, custom middleware, will show performance and reliability which matches or exceeds the performance and reliability of dedicated products, while the cost of development together with the cost of acquiring the present framework remains competitive with that of purchasing and installing a dedicated product.

A desirable distributed system would support a loosely coupled model for distributed systems. By definition, such a system would permit modules that support dissimilar communications system to be integrated together in one distributed system. As result, any change to a module, including its replacement, should in theory not disturb the rest of the system, nor should the addition of a new module require extensive modifications to the rest of the system. To make this possible, messages from one software application must be modified to be understood by a different application.

Objectives and Architecture

A primary object of the present invention is to provide a technology base and the tools needed for the creation of custom middleware products by an average application programmer with little or no experience in system programming. One embodiment of the invention consists of a framework and a method which may be customized by the average application programmer to any middleware solution required. This framework must contain the least common denominator functionality of all possible middleware combinations, and be implemented in the simplest-to-use configuration.

To understand this complexity, it is necessary to further examine how middleware is used today or may be used in the future. As mentioned above in discussing the prior art, middleware products are classified as either bridges or gateways to help describe the difference between them. Bridges provide midway solutions for applications that use the same messaging system to be integrated, even when these are distributed on different hardware platforms and different networks. Gateways, on the other hand, permit integration of applications with different messaging systems into one distributed application. Typically, bridges are used to generate tightly coupled distributed applications, while gateways permit the creation of loosely coupled distributed systems. It is noted that gateways are an extension of the bridge concept, since any gateway must also act as a bridge.

A generic framework must provide not only the functionality required to construct bridges, but also provide the functionality for creating any gateway desired. It is useful to understand the requirements for the least common denominator for all middleware bridges. These requirements may be summarized as follows:

Bridge Requirements

1. Provide concurrent access to any network protocol. This is an obvious requirement of any bridge.

2. Provide independence from any network protocol. Replacing one network protocol with another should not require any modifications to applications dependent on the bridge.

3. Support for asynchronous, non-blocking communication. This is one of the main reasons for distributed applications.

4. Message monitoring. The main function of the bridge is to receive messages and to re-route them to a different system. Although a bridge does not need to understand the messaging syntax, it needs to know when a message has arrived, and it needs to know what to do with it.

5. Message saving and retrieval. Since the system must be asynchronous, the message may not be immediately re-routed, but instead it may be saved and then processed at a later time.

6. Message routing. The bridge does not process messages, but it does re-route them. There must be a way for the bridge to determine where and how to route the message. For any received message, there may be more than one message actually transmitted from the bridge. This occurs if the message is actually a broadcast message, or if there is a need for the bridge to acknowledge the receipt of the message.

7. Simple yet complete Application Program Interface (API). A middleware framework implementing only the least common denominator must provide an API permitting a developer to complete the task of creating the custom bridge. The completion and simplicity of the API provided will ultimately be the criteria for its acceptance by the user community—more so than even the power of the framework.

8. Tracing, debugging and supporting tools. Besides the API, the success of any product requiring programmer coding and customization depends on the presence of a number of tools that simplify the task of customization, debugging and maintenance.

GATEWAYS

To understand all of the requirements for gateway middleware, the architectural design for such distributed applications must be considered.

Gateway Functions

There are two major functions of middleware gateway:

1. Convert messages in a one-for-one mode; e.g., when a message of type A arrives from a system containing the following data chunks $(a_1, a_2, a_3, \ldots a_n)$, the gateway converts it to a message of type B using all or part of the original data chunks but possibly in a different order $(a_{11}, a_{12}, a_{13}, \ldots a_{1n})$ 2. Combine a variety of messages from several remote systems, or even from the same system, to create a new message to be sent to yet another system, multiple-to-one and one-to-multiple. For example, after receiving the messages A and B from system 1, message C from system 2, and messages D, E and from system 3, the middleware combines some of the data chunks from all of these messages in order to create a new message to send to system 4.

In all cases, the gateway must process arriving messages and be able to understand them completely. This requires special intelligence internal to the gateway that may be customized to understand any given messaging system the gateway must mediate. A special program, a control program, must be created by the administrators of the gateway in order to customize it for the task required.

Gateway Requirements

The requirements for the least common denominator for a gateway may be summarized as follows:

1. Application bridge. A gateway is an extension of an application bridge and therefore must have the capability to implement the functions of the bridge requirements 1 to 8 set out above.

2. Message Recognition. A bridge must understand enough of a message to be able to re-route it. A gateway must understand the complete syntax of any message to determine its relevancy in order to act upon it.

3. Function as a proxy. In order to complete a message transformation, the gateway may need to carry through several transactions with one or more remote systems; in fact, to act as an agent on behalf of the remote system that initiated the original request.

4. Extended API, Tools and Aids. As compared to the bridge functionality, the gateway is an order of magnitude more complex, and as result, the API, tools and aids needed to program and administer a gateway reflect this difference.

Finally, it is essential for the success of any such middleware to address the issues of:

1. Performance.

2. Resource requirements.

3. Development, Administration and Maintenance Costs.

The success of any application middleware is judged on this last set of requirements, more so than any other criteria.

A software framework is a structure or scaffolding which requires the addition of custom parts for completion of a task or tasks. A software library is a collection of parts which may be used to customize an application framework. A developer has the option to either acquire a pre-existing framework and customize it for its needs, or to proceed and build the entire system from the start. A proper framework will provide most of the required functionality needed by the application developer, with simple rules for its customization.

FIG. 10 and FIG. 11 illustrate the architecture of the Remote Application Gateway Controlling Program architecture as supported by the MitemView middleware framework. As a framework, the MitemView Server requires customization by way of a set of the programs called Server Interface Modules (SIM) which act as controlling applications for the function performed by the Gateway. This controlling application would typically exist as an entity on the same hardware workstation platform as the middleware framework as shown in FIG. 10. However, the technology presented herein allows the controlling application itself to be treated as a distributed application, permitting its distribution across a network as represented by Controlling Program A and Controlling Program B in FIG. 11. The synchronizations of different parts of the Controlling Application is implemented through the MitemView Server itself.

A basic feature of this invention involves providing a framework and a method for building such custom gateways, as represented in the diagram of FIG. 16. FIG. 16 shows the replacement of the gateway logic of the prior art organization of FIG. 15 with the MitemView framework of this invention. In this case the framework itself accomplishes the major portion of the generic gateway logic (up to 80% of the gateway functions), while the rest of the gateway logic is embedded in the Custom Logic in the form of the Server Interface Module (SIM). This framework provides a scaffolding on which the developer adds the custom logic or SIM implemented as a software library. The middleware framework uses this code on an as-needed basis in order to complete the gateway function required. The scope of developing the user custom code is therefore orders of magnitude simpler and faster than starting from the beginning or modifying the remote applications (gated applications) in order to match the functionality of an existing gateway.

The framework of this invention must have the capability to support multiple simultaneous host connections and to support a loosely coupled model as defined above. To solve the problem of loosely coupled systems (add, modify or remove a remote computer application without extensive modifications to the system), the present invention provides a framework with the ability to support multiple concurrent Custom Logic modules or SIMs, as shown in FIG. 17. A Custom Logic module typically contains specific information relative to how to interface to a remote application, either a server application or a client application. A SIM contains both the custom logic to interface to a server application and the custom logic to interface to the client application, as represented in FIG. 18. In this diagram, the data path from one remote element to the other is through the sets of custom logic that form a SIM and through the gateway framework. Although each such module may be developed independently of the others and have only limited knowledge of the others, together they provide the complete functionality required to integrate all of the remote computer applications into one distributed system.

The addition or the removal of a remote system may require the addition or the removal of at least one custom logic module (SIM). Typically, since all of the SIMs form an integrated system, the addition or the removal of such a SIM would require at least some changes to other modules that need to be aware of it. Also, changes to any of the remote system would also require modifications to at least one SIM. This effect would dilute the solution for solving the loosely coupled problem. However, by removing this information to an external Custom Object Database, as shown in FIG. 19, and making it available through the framework to any SIMs that need it, the need to re-code the SIM each time this information is modified is eliminated. Instead, any changes to the system will require changes only to such databases, a requirement which is considerably easier to meet than any code modifications. FIG. 19 shows how these parts integrate naturally into the server technology, by providing equivalent services to the MitemView framework and custom logic modules.

The removal of system-dependent data from the code to object databases and the definition of what kind of data should be removed to the database, together with the choice of a framework capable of supporting a modular architecture as described above, implemented with the architecture described in the '137 patent (which provides a solution to the problem of non-determinism), constitutes a complete solution to the problem of loosely coupled distributed applications, and forms the core of the present invention.

As stated above, the present solution is implemented as a framework and method for building any type of middleware required for the development of distributed applications. FIG. 3 of the '137 patent shows how this framework and method may be used to build a client application, referred as an AIM, which controls the execution of one or more remote applications programs. In that case, the Client Application, having a user interface, resides on the same workstation as the one containing the framework. This case, which is illustrated in FIG. 1 of the '137 patent, is shown more simply sketched in FIG. 12 herein. This figure, which shows the controlling of only one remote host application, may be expanded to show the controlling of two or more remote host applications, from the same AIM or Client Application, as shown in FIG. 13.

DESCRIPTION OF THE PREFERRED EMBODIMENT

Figure 14:
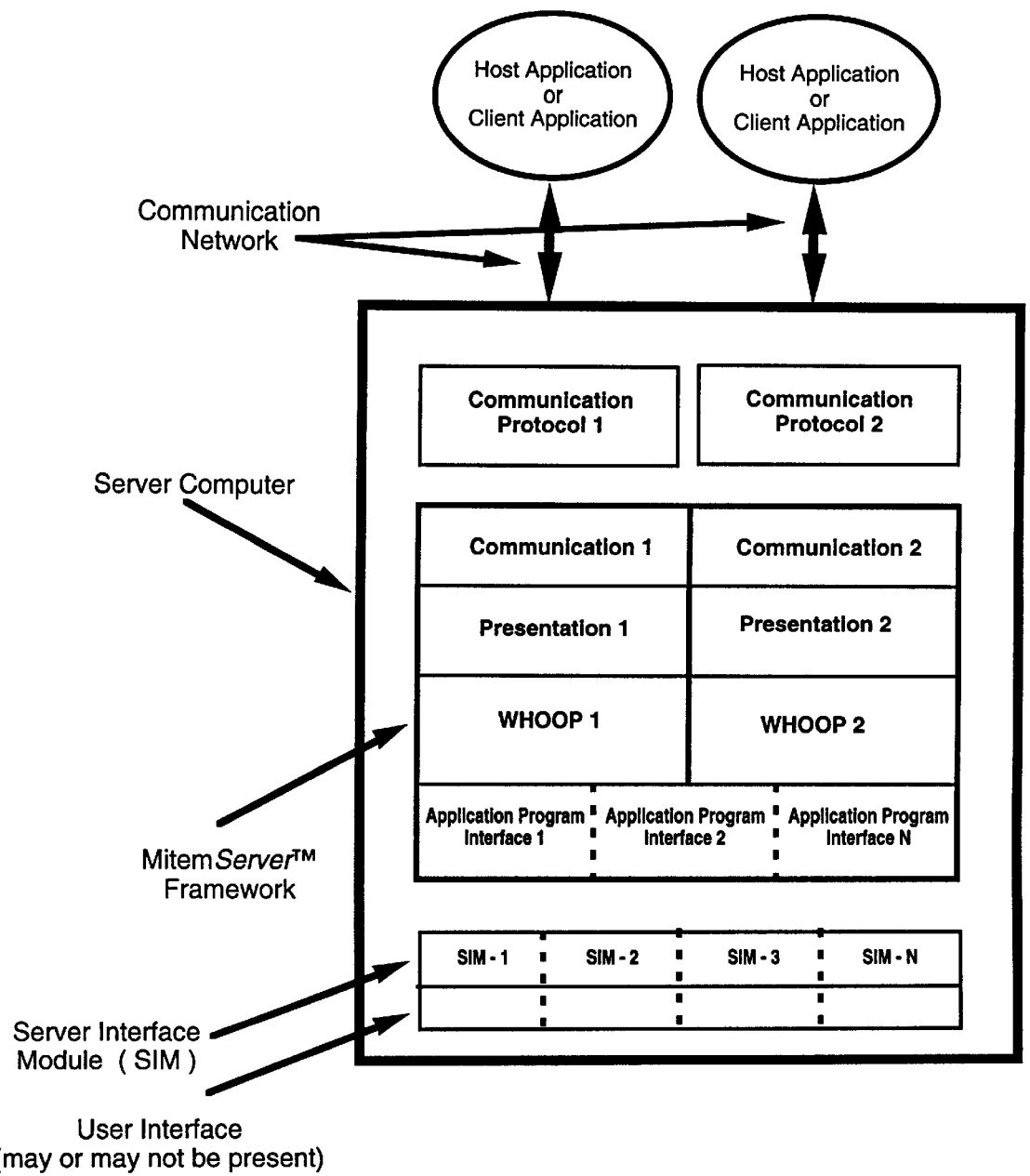
FIG. 14 is similar to FIG. 13, illustrating the use of a plurality of Application Interface Modules.

A gateway which satisfies the requirements stated in the above discussion has a functional diagram as shown in FIG. 14. The only major difference is that the SIM is designed to process messages and data from one of the remote systems in order to generate another message and data to the other system. The AIM is the ultimate receiver of information from all the remote systems and therefore contains the business logic and the User Interface required to communicate with the ultimate user. The SIM, on the other hand, may or may not have any User Interface or business logic. Even in the case when a User Interface is provided, this is done for the benefit of the system administrator in order to monitor the gateway performance, which is never seen by the ultimate user.

Figure 10:
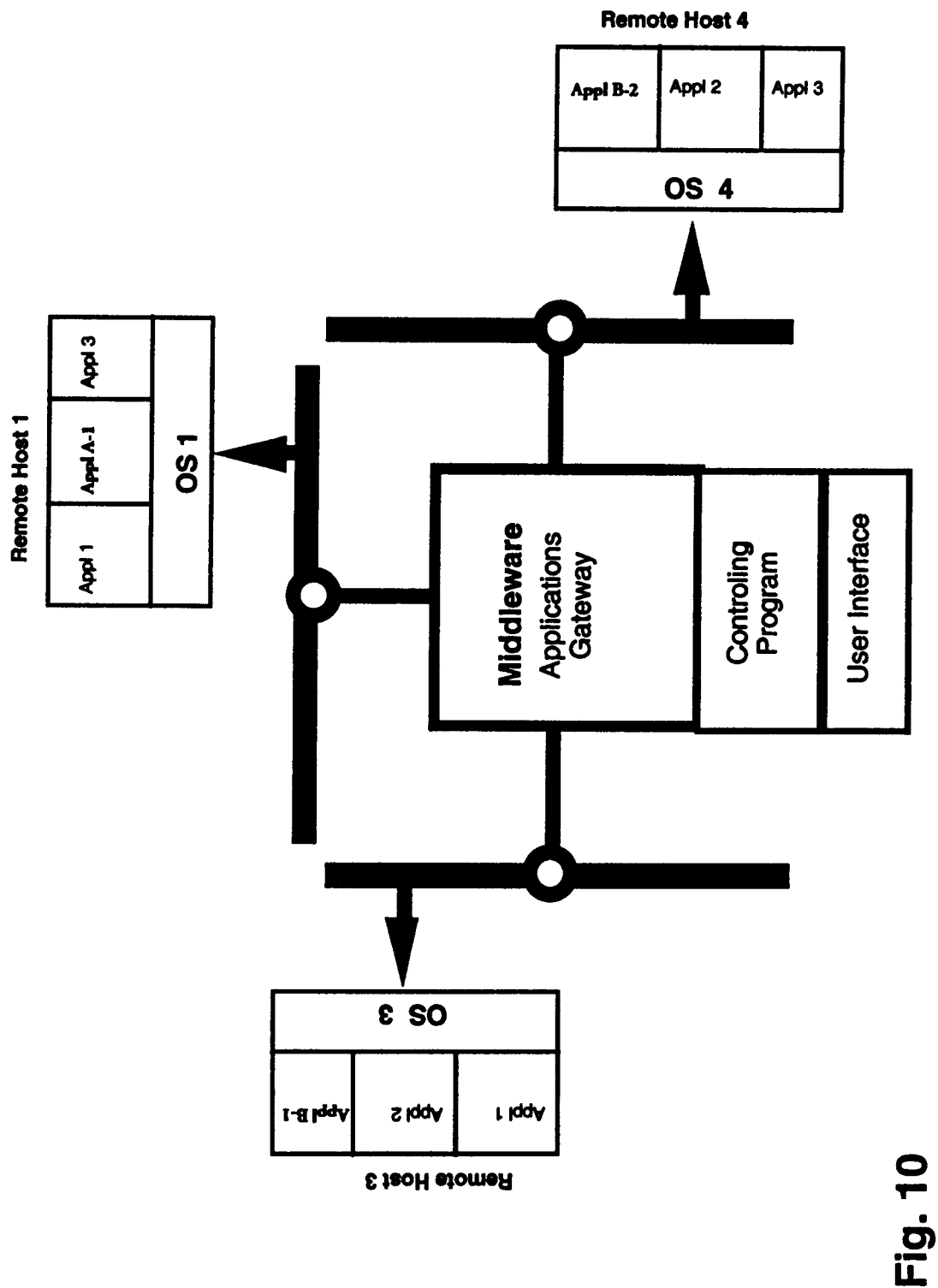
FIG. 10 shows the function of a single Remote Application Gateway Controlling Program as supported by the MitemView middleware framework.
Figure 11:
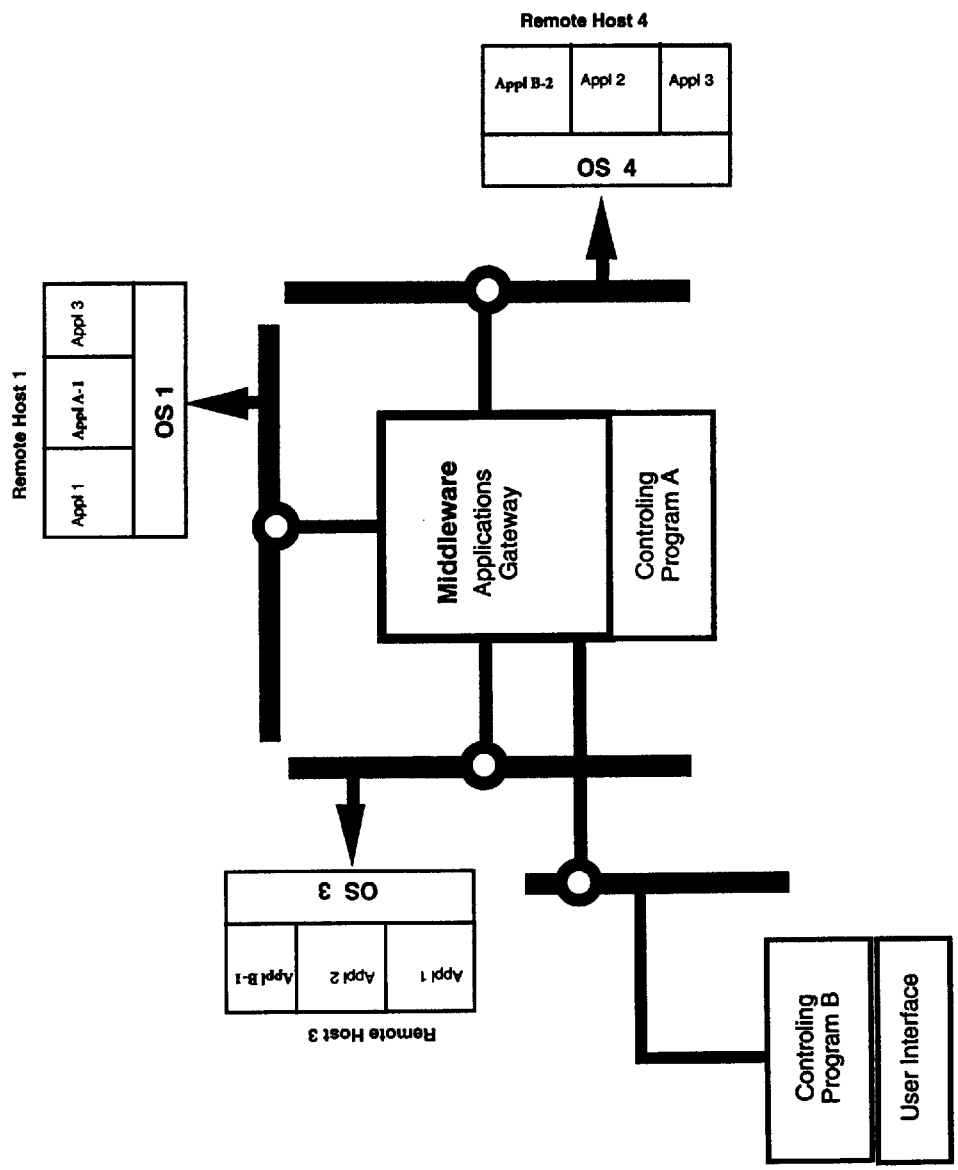
FIG. 11 illustrates the function of a plurality of Remote Application Gateway Controlling Programs as supported by the MitemView middleware framework.

With some exceptions, which will be pointed out below, the framework and method described in the '137 patent may be used as the basis for the gateway framework described herein. The '137 patent shows how such a program may be created efficiently and reliably. That patent might appear to limit this architecture to the case where the controlling program resides on the same computer as the gateway software, as seen in FIG. 10. However, using the gateway properties of the present invention, the controlling program itself may be distributed between several computers, as shown in FIG. 11.

The "Objectives and Architecture" paragraphs above list the requirements for application bridges and the required functions of application gateways. The following shows how these requirements and functions are met by the present enhanced middleware framework which was evolved from the framework and method described in the '137 patent.

1. Provide concurrent access to any network protocol.

Figure 15:
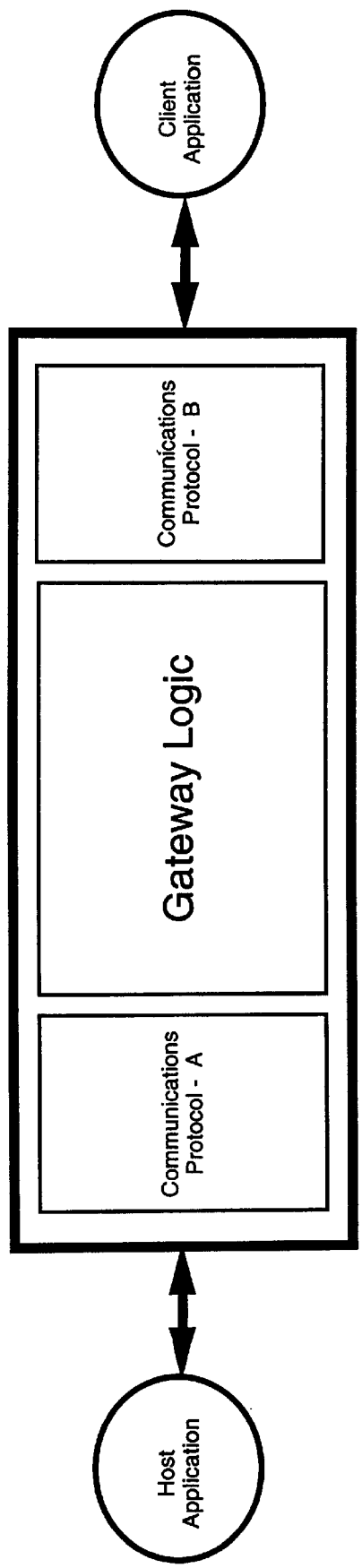
FIG. 15 is a simplified diagram of a generic gateway system comprising a host or server application and a client application.
Figure 16:
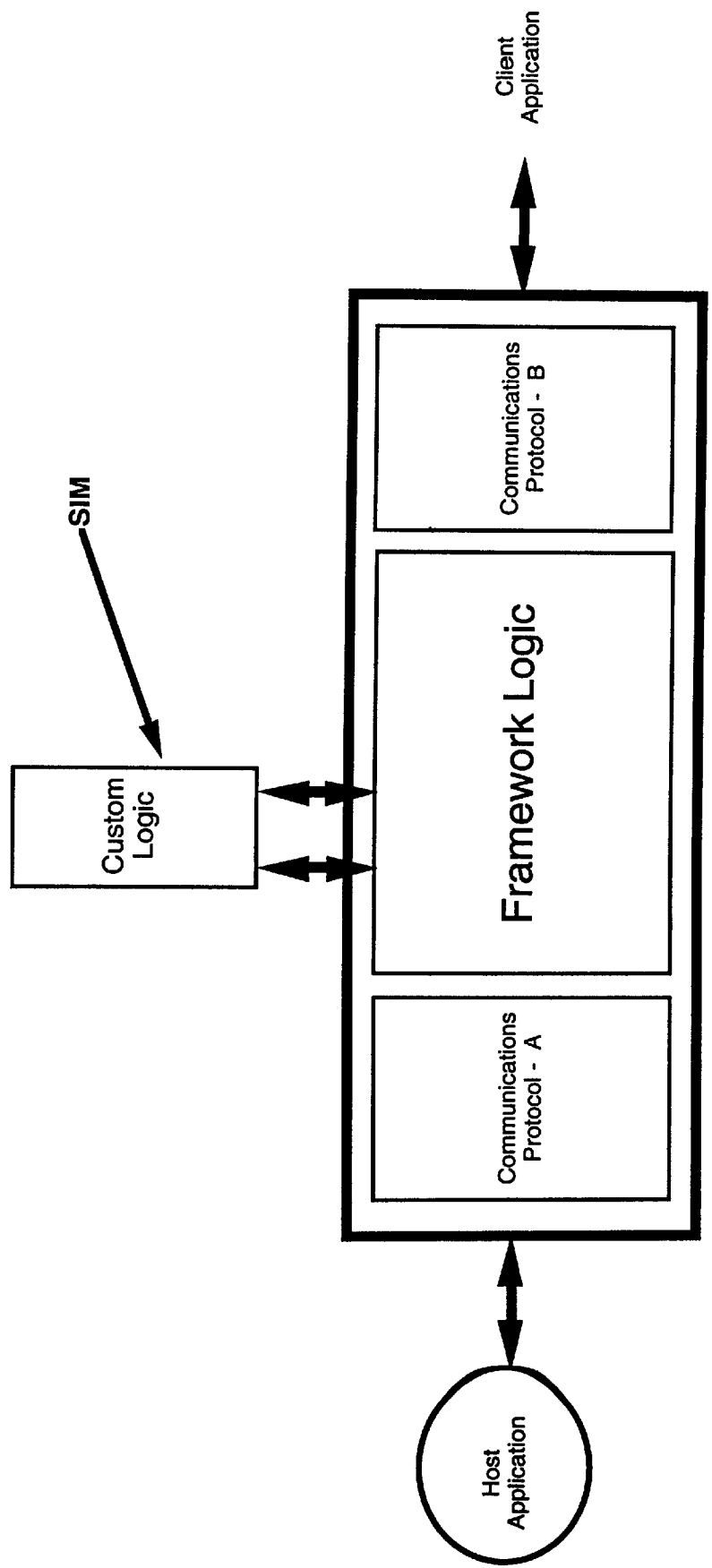
FIG. 16 shows the replacement of the gateway logic of FIG. 15 with the MitemView framework logic of this invention.
Figure 17:
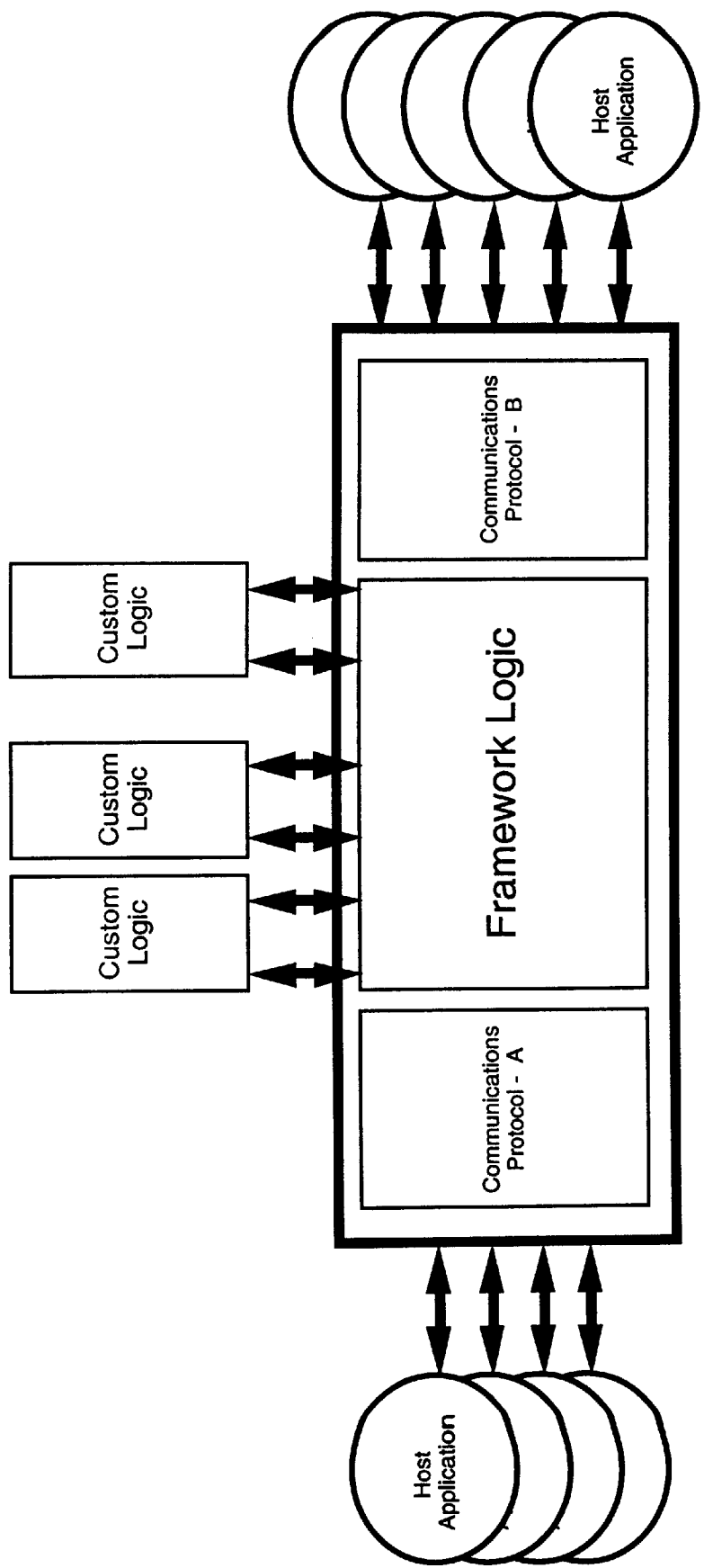
FIG. 17 shows the use of multiple Custom Logic modules to support multiple remote host applications.
Figure 18:
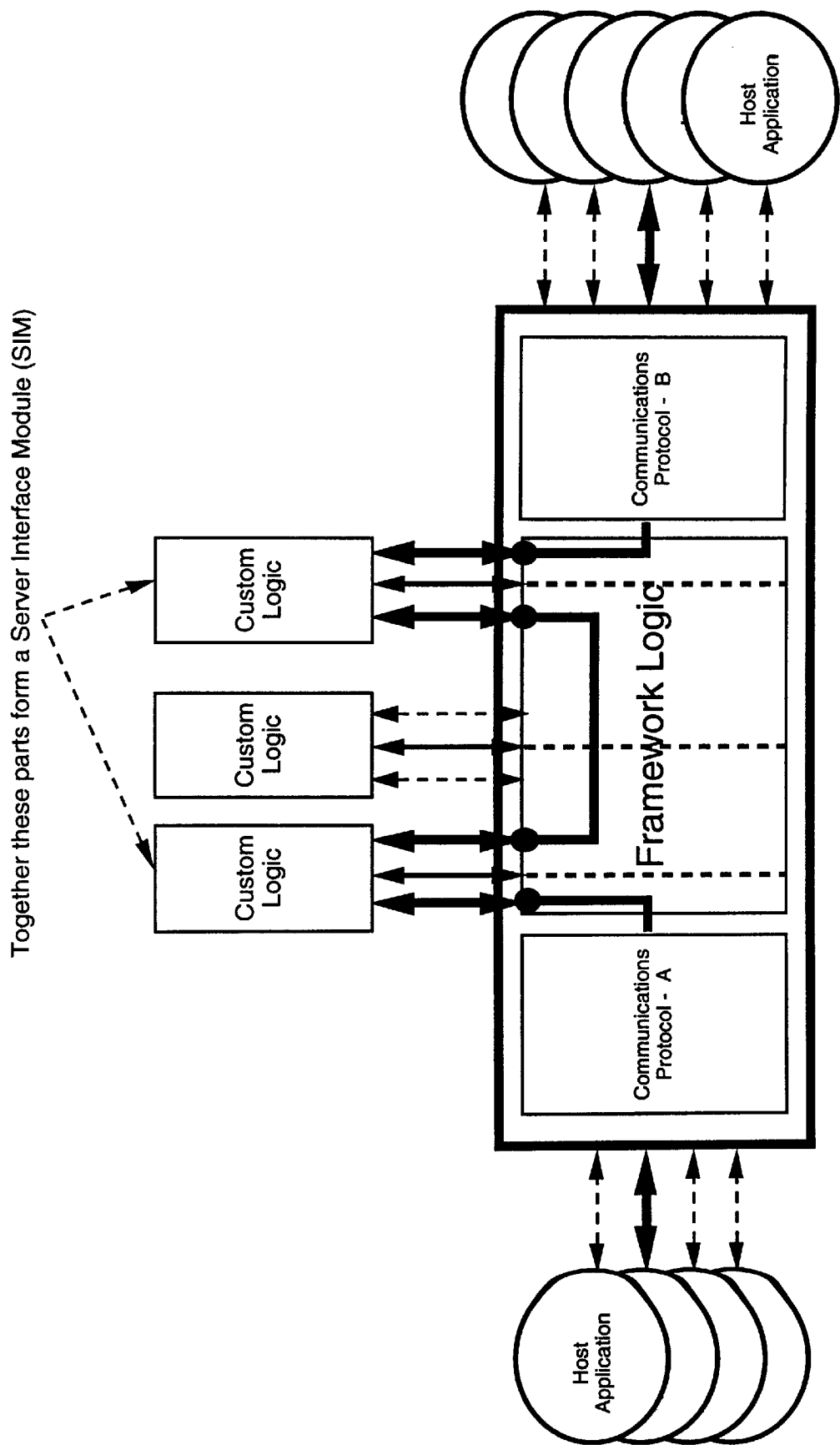
FIG. 18 illustrates the formation of a Server Interface Module with a plurality of custom logic modules.
Figure 20:
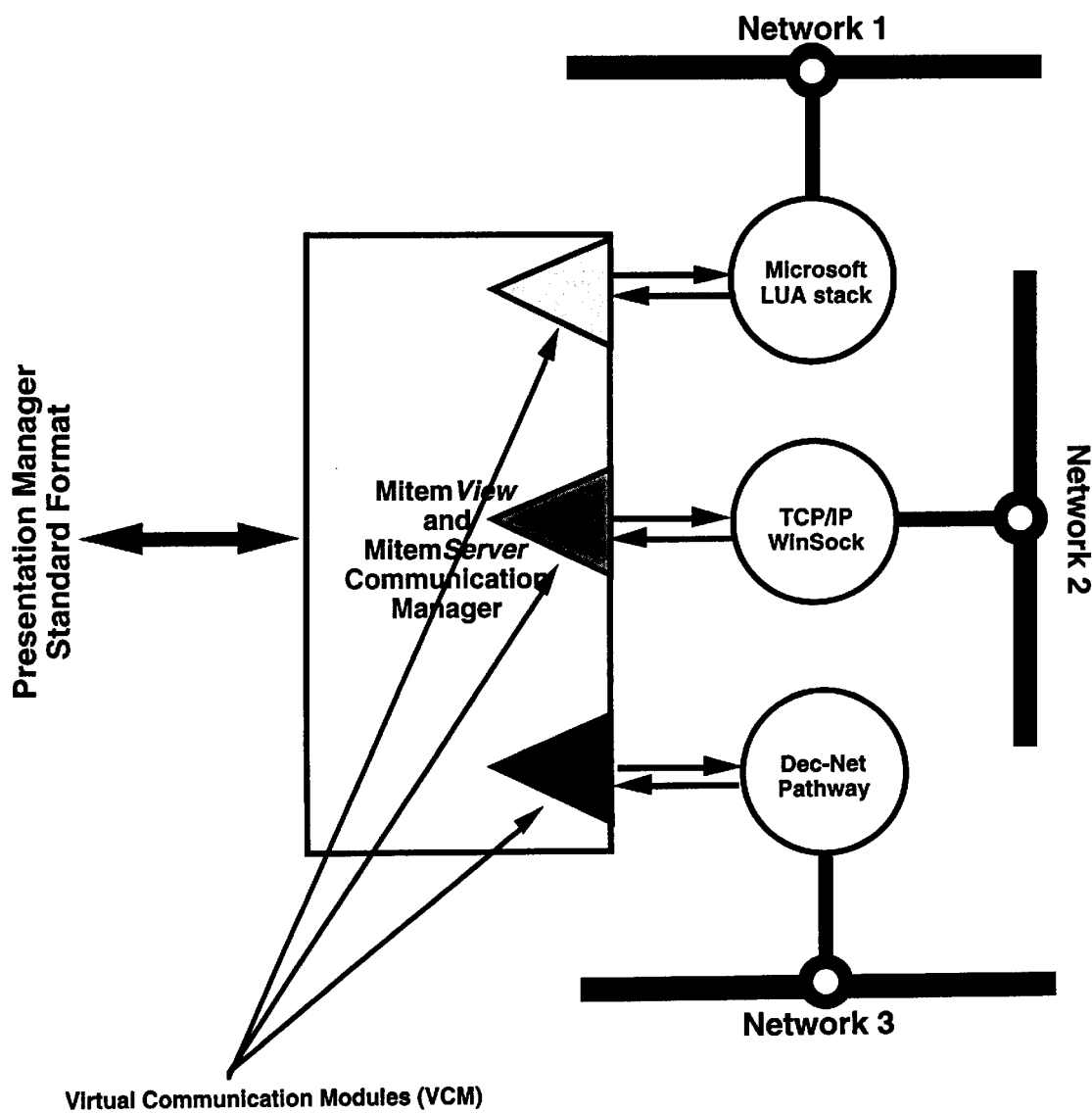
FIG. 20 shows the Virtual Communication Manager sub-assembly and the role played by another set of custom modules called Virtual Communications Modules.

The '137 patent discusses in connection with FIG. 15 therein that the MitemView framework supports multiple communications methods through the use of the capabilities of the Communication Manager. This is a unique and essential function of the present framework and method, since it permits them to bridge a variety of communications stacks. Such communications stacks are typically developed by network providers and are in constant transition, driven by the need for better and more powerful communications. The framework of the present invention provides a mechanism for accommodating such changes and is broad enough to permit access to a variety of otherwise very different communications methods and stacks. It is able to work equally well with TCP/IP stacks, SNA & SDLC direct channel connect stacks, Novell SAA, Microsoft LUA architectures or DEC-Net protocol, as shown in FIG. 20. It would be very difficult and complex to code all these different communications methods within the Communications Manager; therefore, some module must be built to enable the communication manager to interface to the network communication stack.

Figure 9:
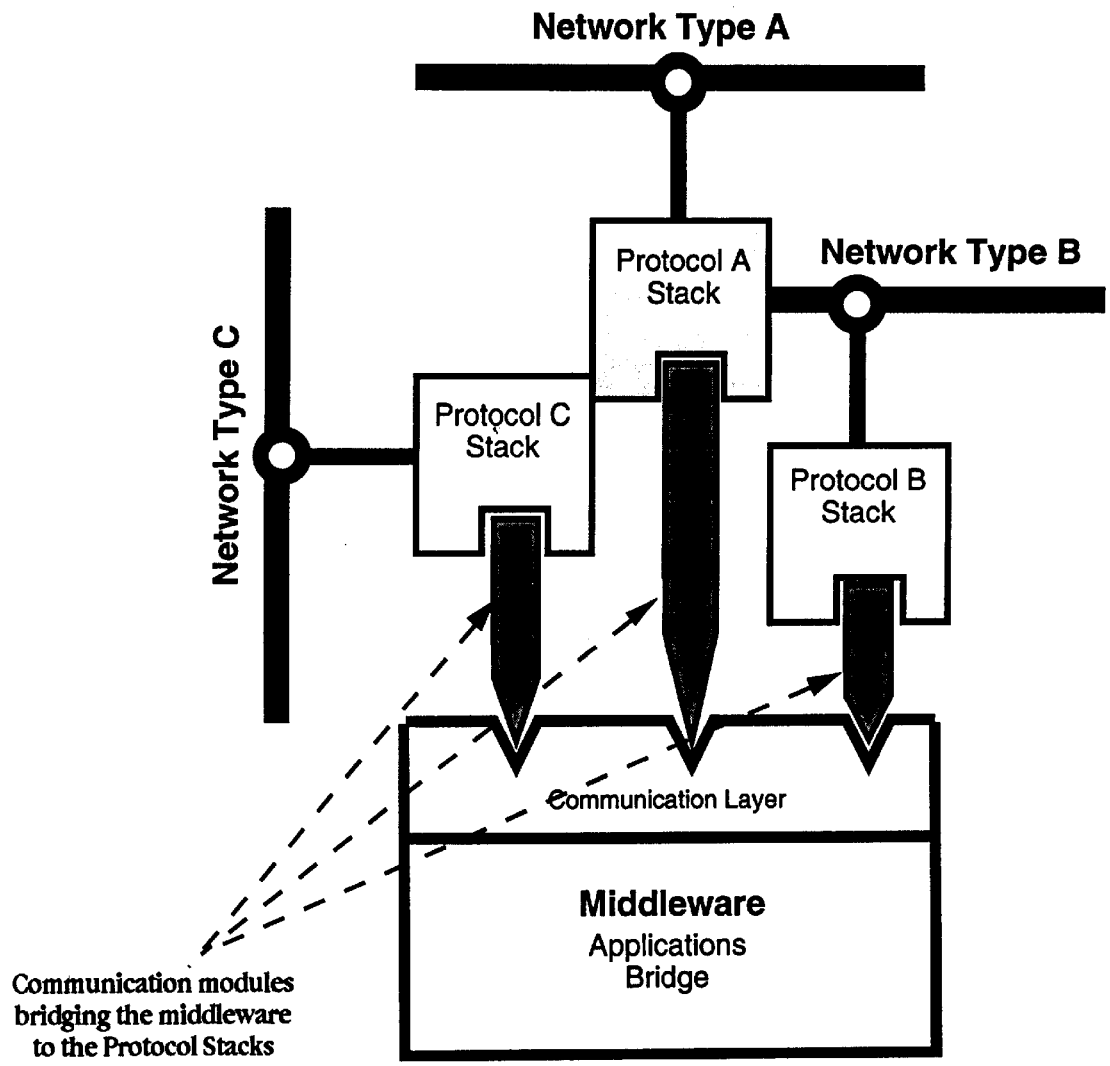
FIG. 9 is a diagram showing the main role of the Communication Layer used both by the MitemView and the MitemView Server of this invention for working with networks of different types.

Typically this would be achieved by a software driver and a library of functions callable from the driver in order to integrate such a communication manager to the driver. The present invention reverses this process and implements the Communications Manager as a universal driver which needs to be customized by a library of code routines, called a Virtual Communication Module (VCM). FIG. 9 is a diagram showing the main role of the Communication Layer used by both the MitemView and the MitemView Server. In this diagram, various Protocol Stacks (A, B, C) are typically provided by various network vendors. The Communication Layer is provided with an API which permits any developer to create a set of modules which bridge the MitemView Server Communication Layer to the Network Protocol Stacks. FIGS. 9 and 20 illustrate how the system manages the interactions with each of the network stacks, freeing the developer of the VCM from understanding or dealing with the complexities of modern communication drivers. More importantly, there is a large degree of freedom permitted in the implementation of such a VCM which allows for accommodation into the present framework of very dissimilar network protocols. Since the Communication Manager makes the calls into the VCM, there is a very large gain obtained by optimizing the performance of the Communication Manager instead of relying on the VCM developer to do so in each module. Also, a large amount of common functionality, for tracing and debugging, recording and playback, filtering, etc., is placed in the Communication Manager itself, restricting the VCM to only the very specific functions required for interfacing to the network communication stack.

2. Provide independence from any network protocol.

Figure 1:
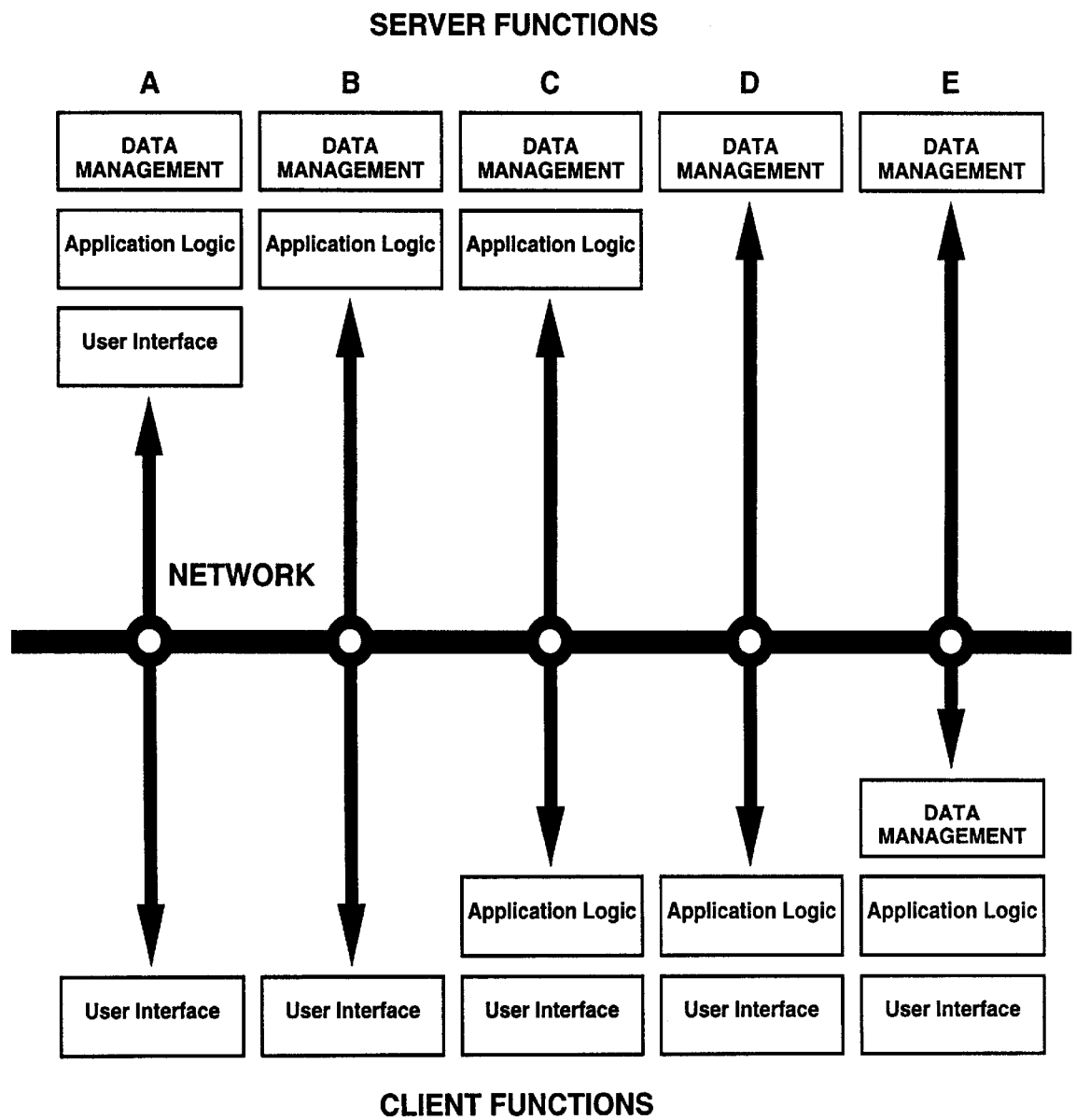
FIG. 1 is an architectural diagram showing the function of a network between a plurality of client functions and a plurality of server functions.
Figure 2:
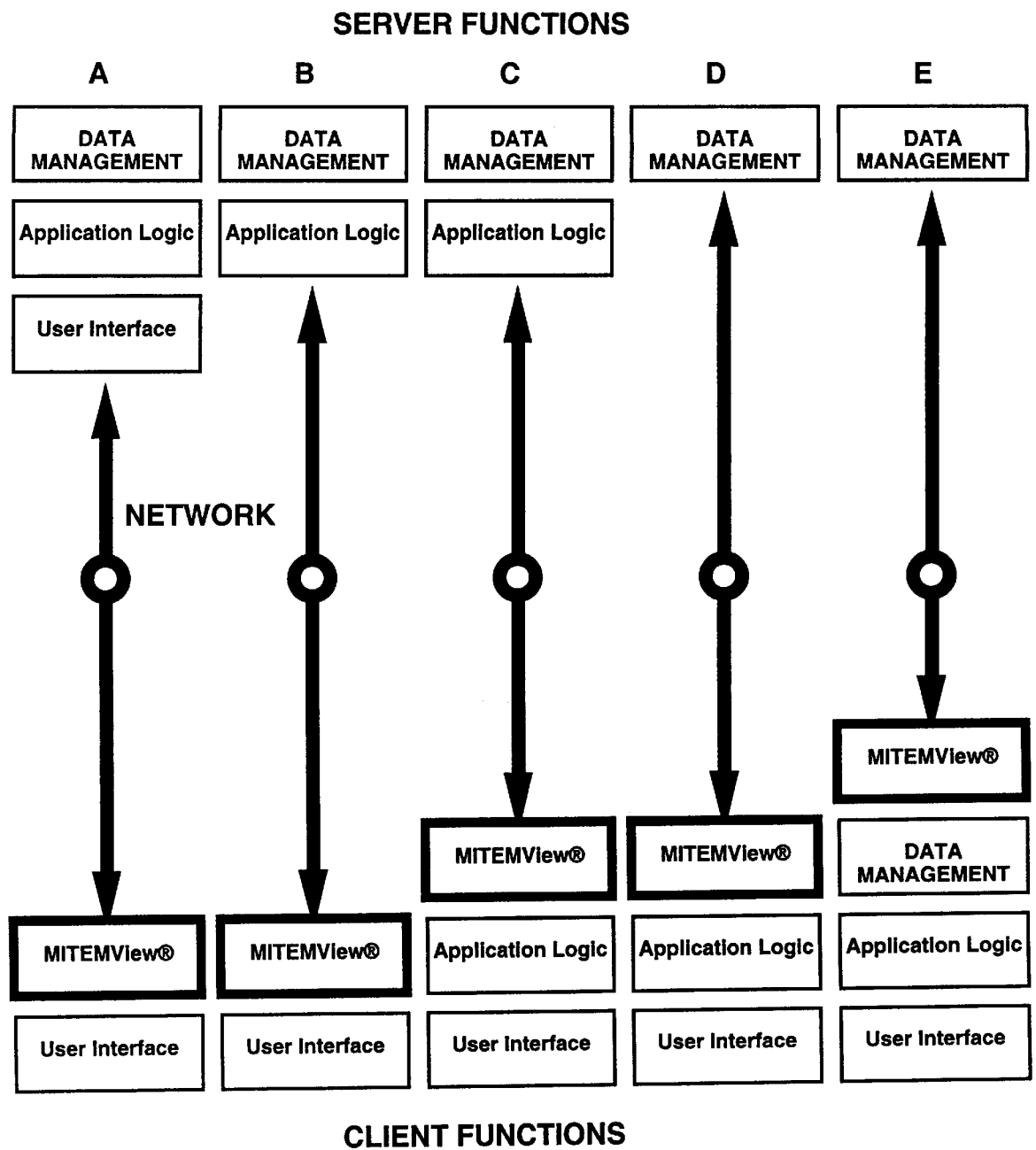
FIGS. 2 is an architectural diagram, based on the Gardner Group classifications of distributed applications, showing the current use of the MitemView technology based on the implementation described in the '137 patent.

Data that is received by the communications manager from a variety of originating sources and network protocols is normalized to a unique common format in order to be passed to the next level; the Presentation Manager, as represented in FIGS. 1 and 15 of the '137 patent, and in FIG. 20 herein. The goal for this normalization is to provide independence from the network protocol. This means that an IBM-3270 data stream from an IBM host application may be delivered to the present server in any of many networks protocols, such as SNA, SDLC, TCP/IP, IPX/SPX, etc., but the data received by the presentation must be free of any network dependency.

Figure 21:
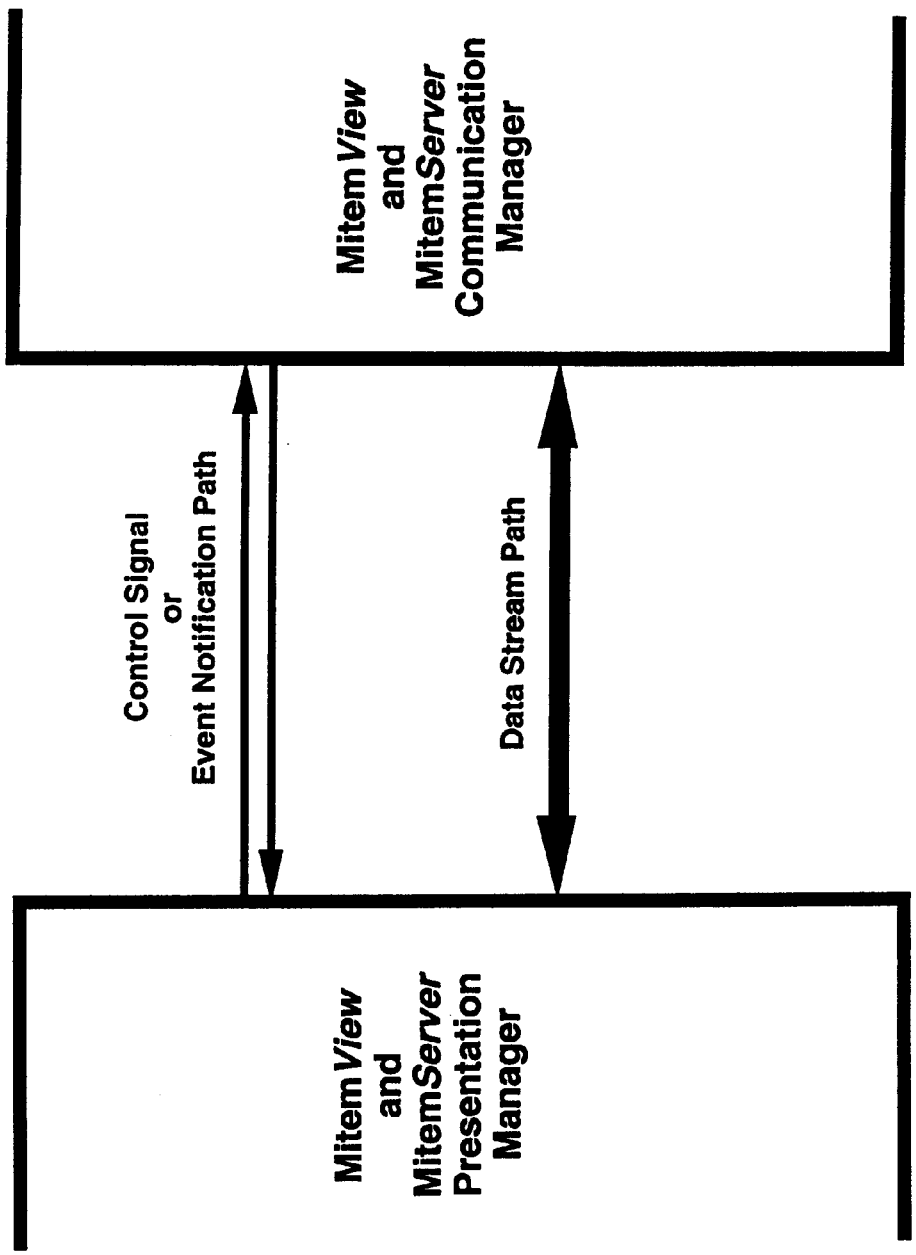
FIG. 21 is a diagram showing the two communications channels between the virtual Communication Manager and the virtual Presentation Manager sub-assemblies.

The meaning of the data may not be changed, since it must be used by the upper layer. However, there are some cases where some network gateways may modify the actual meaning of the data, this being common with "half stack" gateways, such as Novell or Microsoft SAA and other gateways. As result, to achieve normalization, there are occasions when it is not sufficient to only strip the network dependent data, but some changes to the meaning of the data itself must be made. In practice, this turns out to be very difficult, because enough distortion may have been introduced to make reconstruction impossible. So, instead of attempting to normalize the data stream from the Communication Manager to the Presentation Manager, the present invention utilizes a different strategy of using Control Signal or Event Notification channels for normalizing missing or distorted data stream pieces, as shown in FIG. 21 and described in more detail below.

As result, under some conditions the VCM may contain code to generate Control Signal or Event Notification to the Presentation Manager in order to reconstruct some missing information. A redundancy of methods is introduced into the system in order to achieve the actual normalization. The same result may be obtained from passing a data packet to the Presentation Manager via the Data Stream Path or by generating a Control Signal or Event Notification from the VCM to the Presentation Manager.

3. Provide support for asynchronous non-blocking communication.

Whatever the middleware employed, it must accommodate and mediate between different remote applications running at the same time. The middleware must be able to support a varying number of concurrent sessions, all requesting attention from the CPU. Various complex and expensive schemes have traditionally been employed in order to mitigate resource utilization required by various sessions. This is a complex topic and not addressed herein except to note that all such schemes may be classified as being either synchronous/asynchronous or blocking/non-blocking. Each selection has some tradeoffs. The synchronous/blocking system is the easiest to implement but has relatively poor performance, while the asynchronous/non-blocking is the most difficult to implement but has the best performance.

An asynchronous/non-blocking middleware system typically requires not just a complex implementation of the middleware itself but also expert programming skills from the developers to customize such a system. A challenge in developing the present invention was to find a programming paradigm that permits a non-expert programmer with average computer communications skills to achieve the same objective as an expert, without any extensive retraining.

The solution is based on the concept described in the '137 patent of converting all the communications messages into programming events. This required that the present middleware be implemented as a programming framework, since all the developer is required to do is to create a library of "event handlers" for each possible communication message event. A developer does not need to know any complexity associated with asynchronous/non-blocking programming, since all of it is hidden by the framework itself.

4. Message monitoring

Figure 3:
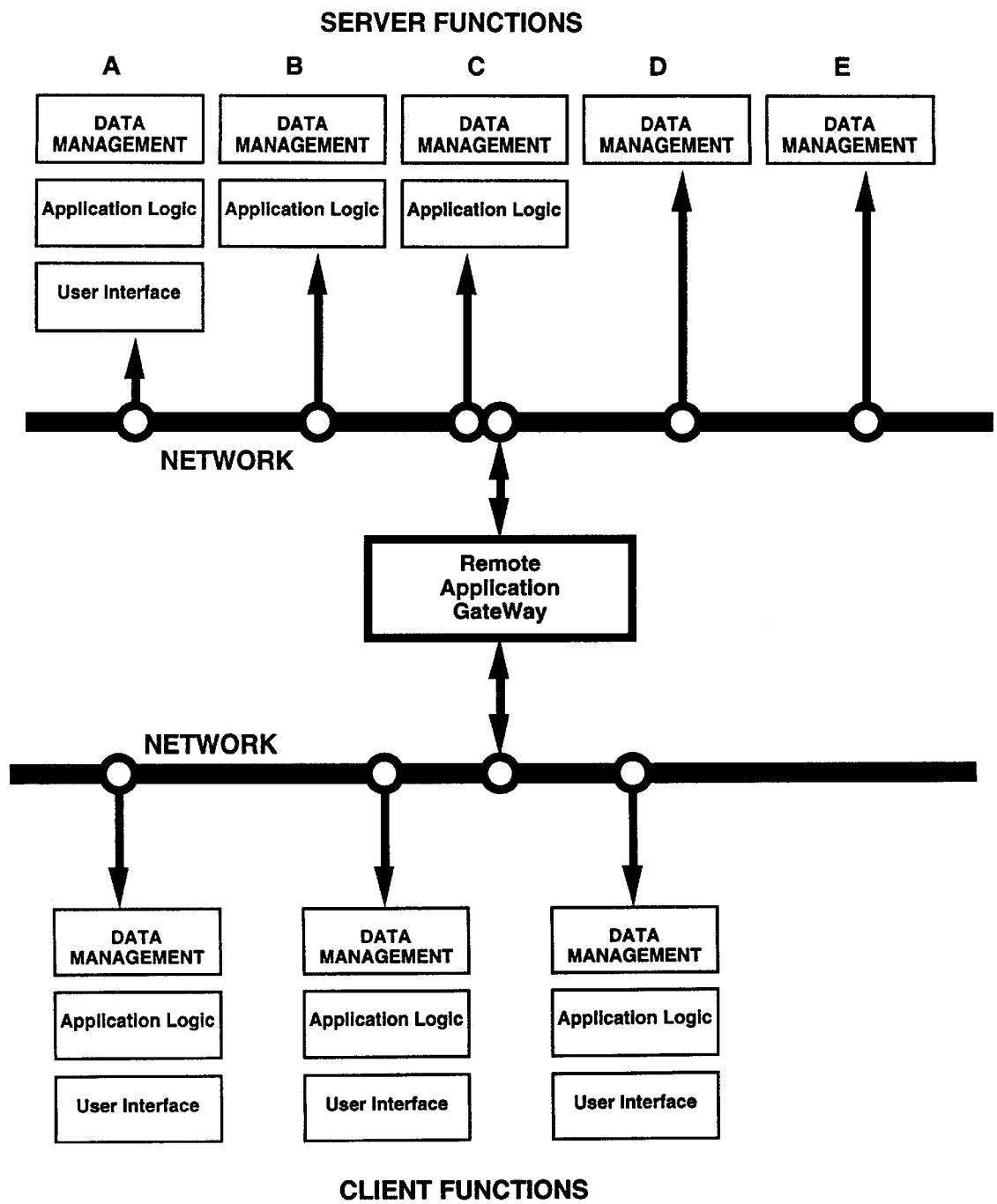
FIG. 3 shows the location of the Remote Application Gateway Server (RAGS) of the present invention in the same Gardner Group architectural diagram.
Figure 4:
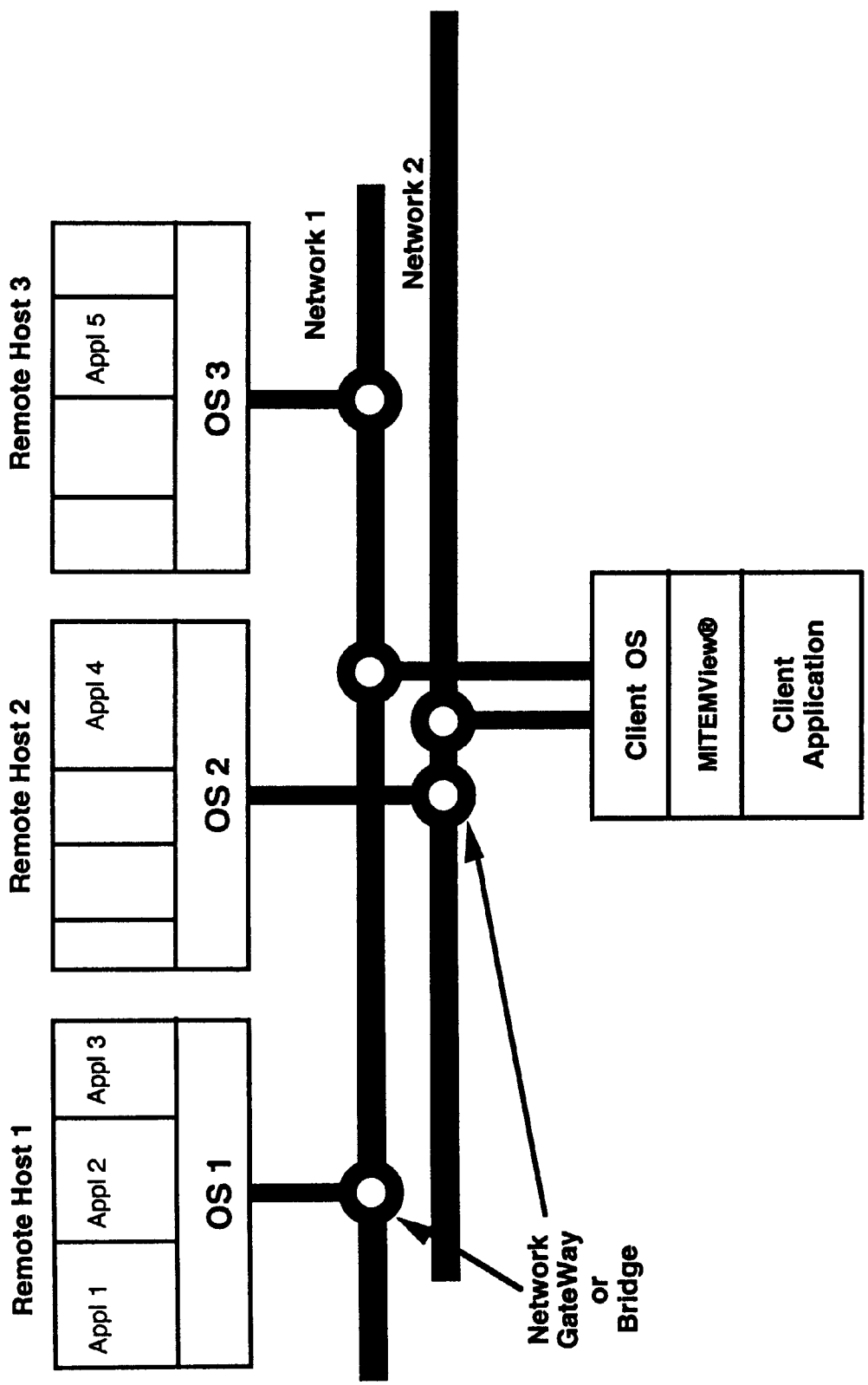
FIG. 4 is a simplified diagram of FIG. 2, showing integration of various remote servers (Applications) into one client application using MitemView as shown in the '137 patent.
Figure 5:
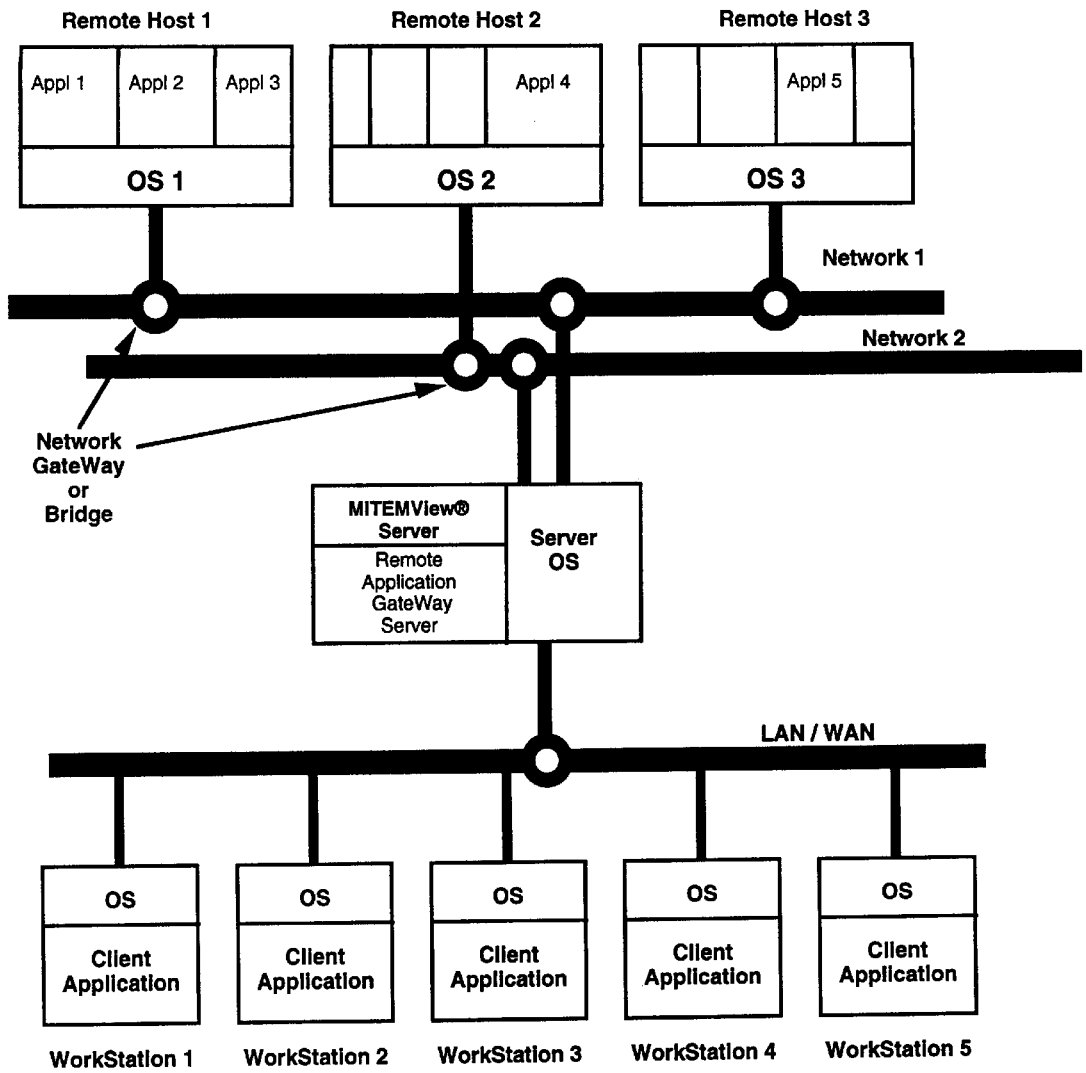
FIG. 5 shows the high level architectural design of the Remote Application Gateway of this invention using the technology described herein.
Figure 6:
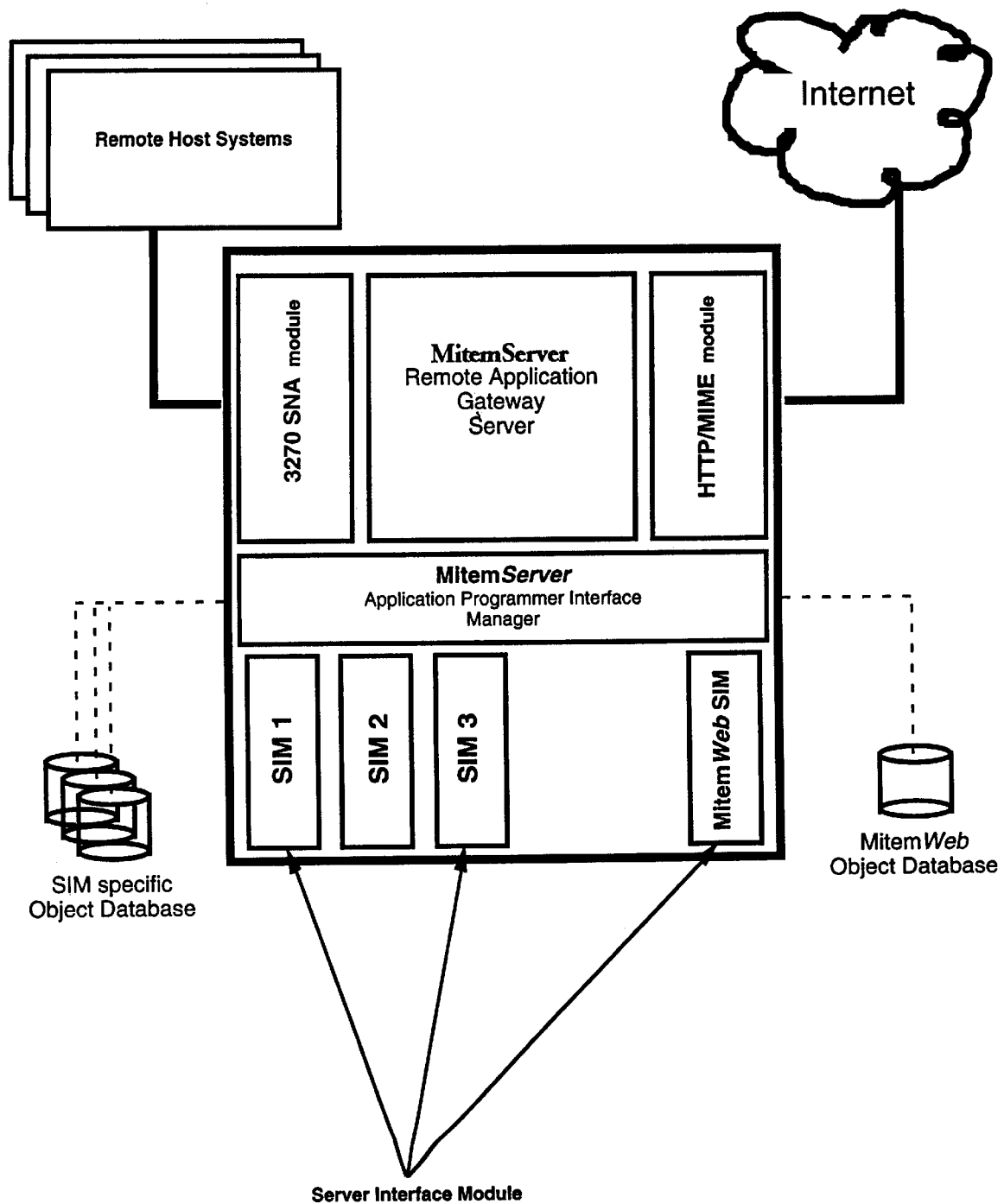
FIG. 6 illustrates by example how the MitemServer gateway mediates between several remote host applications and the Internet/Intranet Web Browsers. A detailed explanation of how HTTP/MIME module works is discussed below.

The '137 patent describes a method for recognizing and monitoring message activity from and to a remote application. Although the examples mentioned in that patent rely on host applications that communicate via a terminal emulation, VT100 or TTY, the method is not restricted to such applications. Referring to FIGS. 3, 5 and 6 of that patent and the corresponding paragraphs in the "Description of the Preferred Embodiment" therein, the use of Normalization and Accumulation for terms describes the initial steps in the message monitoring activity. The same process of Normalization and Accumulation applies equally to messages from a remote application that are meant to be shown through a computer terminal, VT100 or IBM3270 etc., or to binary data messages meant for another program and which do not require a computer terminal. Such an example is presented in the description of Normalization of the HTTP/MIME messages set out below.

Figure 22:
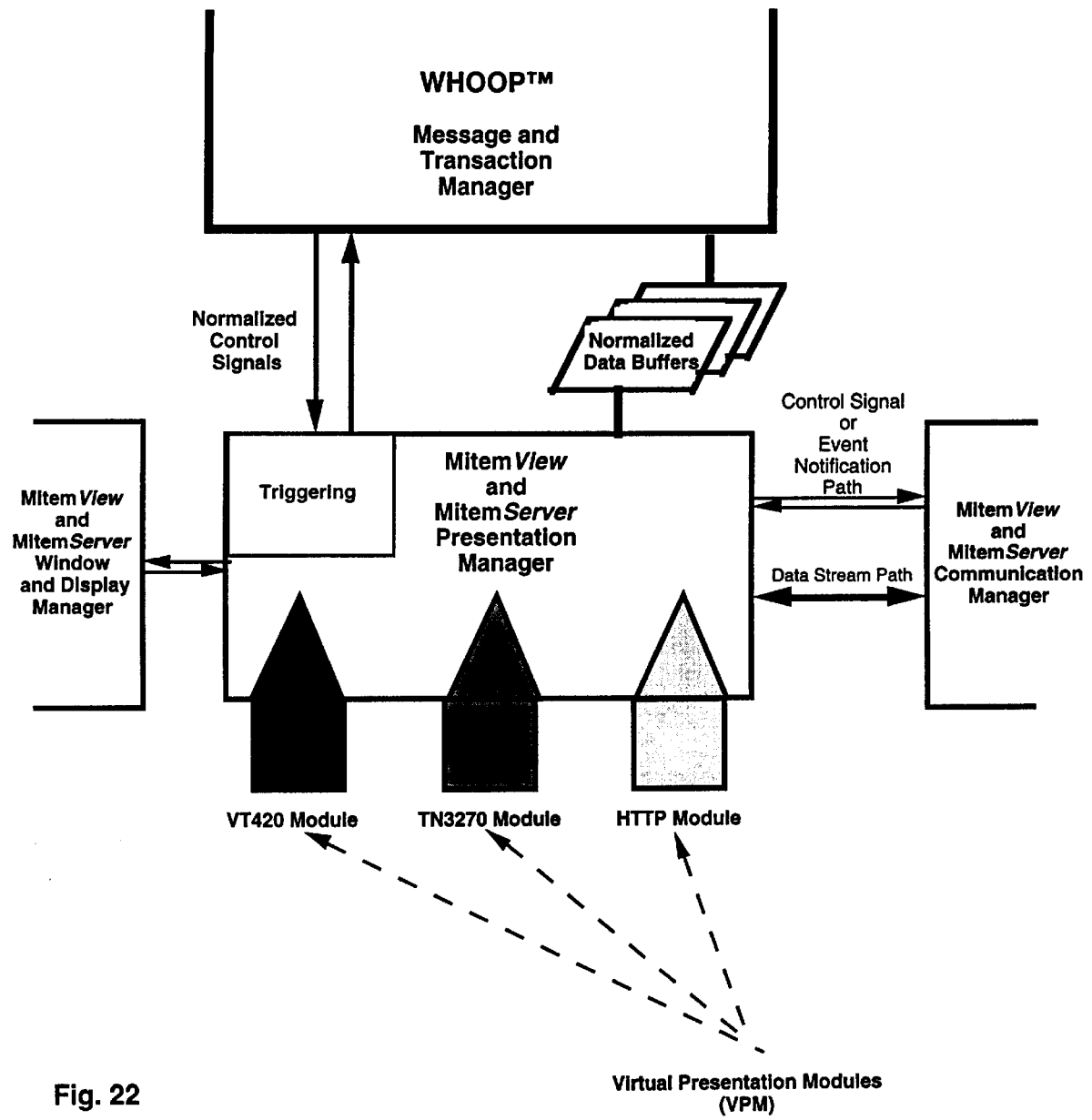
FIG. 22 shows a system of this invention employing a plurality of different Virtual Presentation Modules.

Most of the processes of Normalization and Accumulation are accomplished in that portion of the present framework entitled Presentation Manager as shown in FIG. 15 of the '137 patent and FIGS. 21 and 22 herein. The function of the Presentation Manager in the context of the computer terminal is described in the '137 patent. In the present application, the definition of the Presentation Manager is expanded to include any data stream from one computer to another intended for communication. Its function is to normalize and accumulate messages, either intended for a computer terminal or another computer program, and to generate normalized control signals to the WHOOP (Watch Host Patterns)—the generic name for the present Message and Transaction Monitor.

The process of normalizing and accumulating data intended for a computer terminal (terminal emulation) is discussed in the '137 patent. In summary, it is intended to accumulate such data into a three dimensional normalized buffer (row, column and attributes, including color attribute) which can be then analyzed by the WHOOP. By this process, the WHOOP is insulated from any knowledge of the original data stream and of the particulars of the network protocol.

Figure 7:
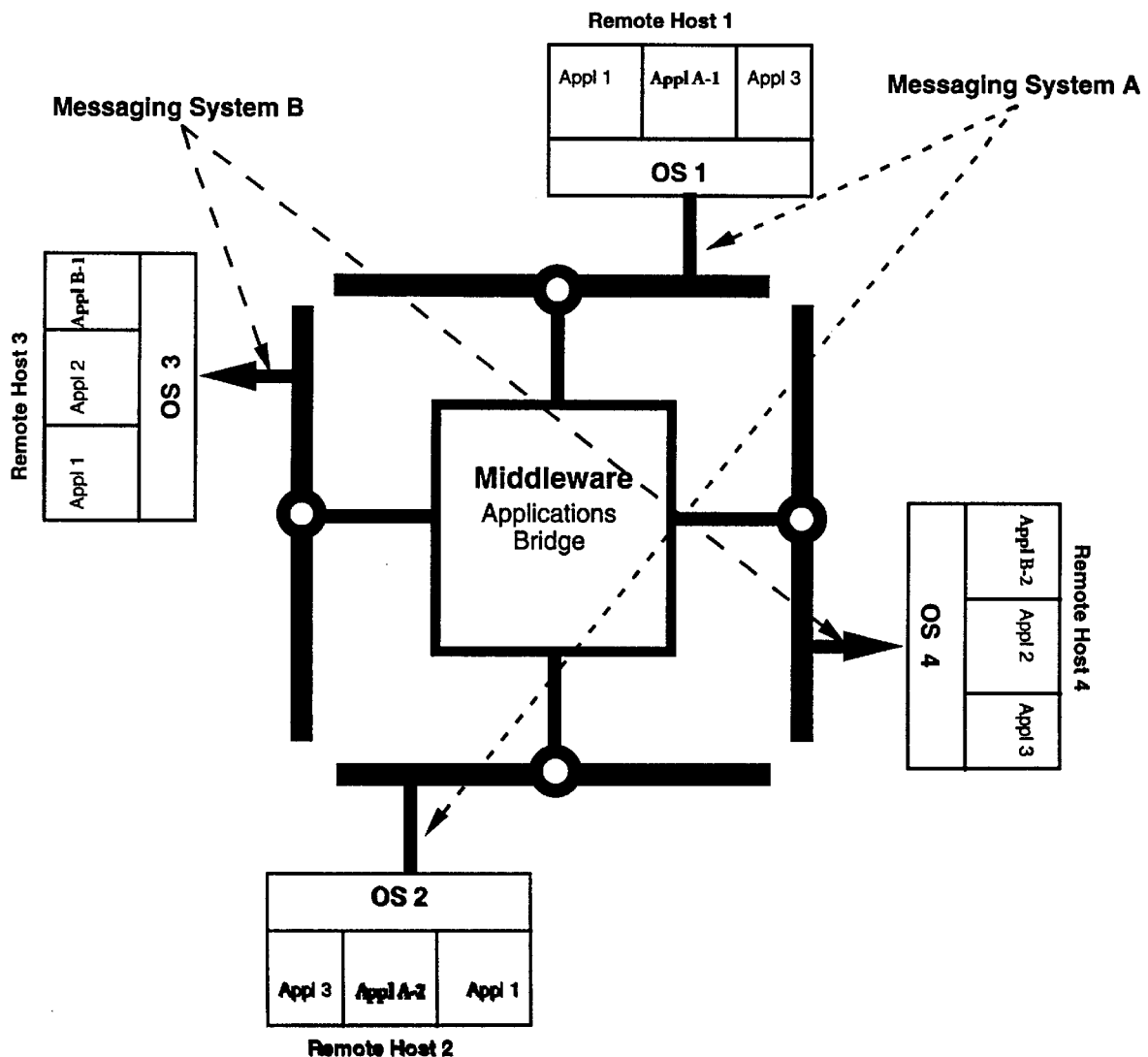
FIG. 7 shows how an application bridge manages messages by queuing and redirecting them from one system to another without changes to any message.
Figure 8:
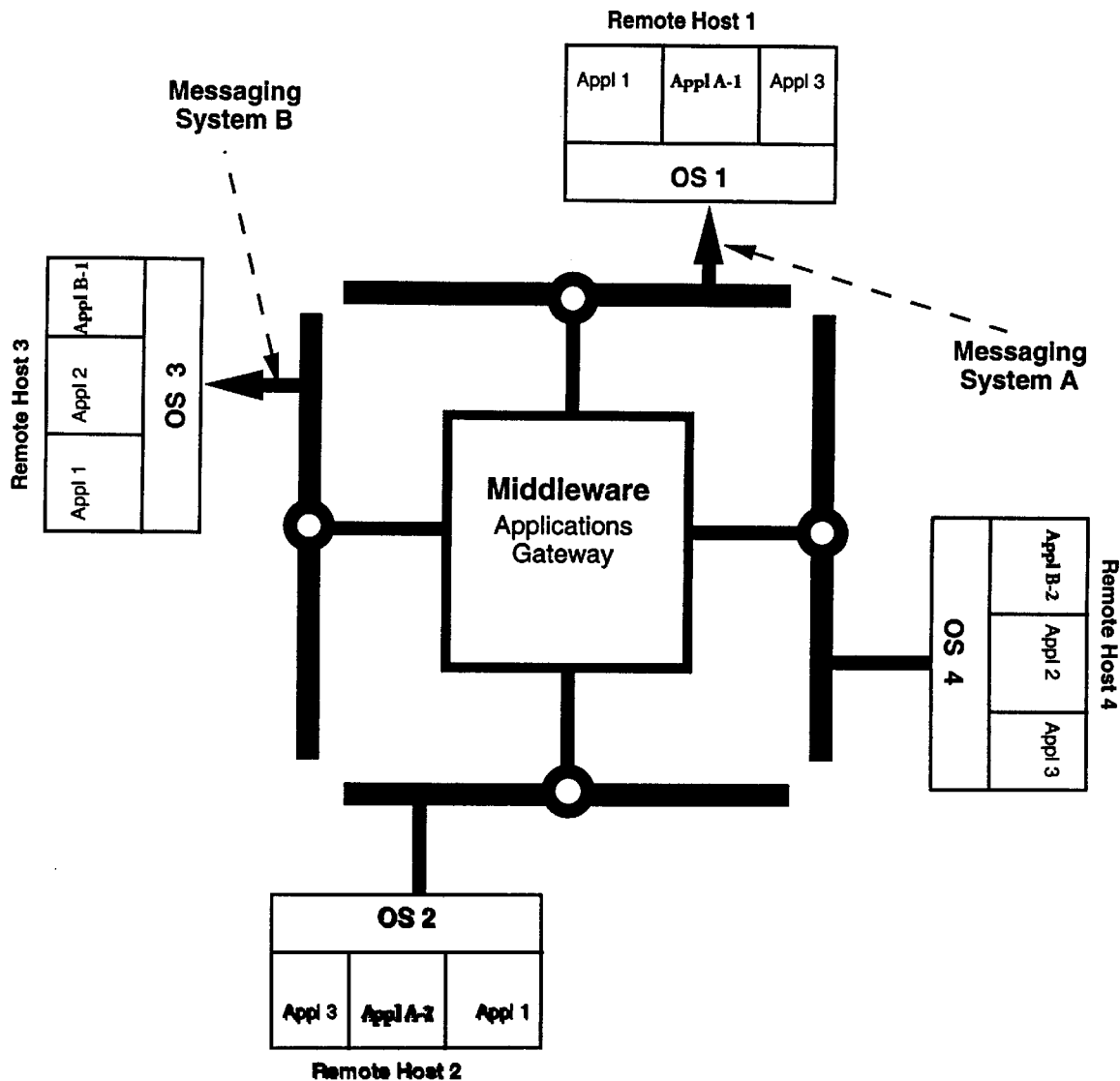
FIG. 8 illustrates an application gateway converting messages of one type to messages of another type.

By realizing that there are no conceptual differences between messages addressed to a computer terminal and ones addressed to another computer program, except in the message semantics, the present invention expands the application of the Normalization and Accumulation described in the '137 patent to include any kind of message. This process requires the parsing of data in the message and placing it into the Normalized Data Buffers and in the identification of trigger signals, as seen in FIGS. 5 and 7 of the '137 patent. There is no automatic way to achieve this, given the infinite variations in the message semantic possibilities, so some custom code is provided for each semantic. This is accomplished by the same method used for providing encapsulation in the Communication Manager via the Virtual Communication Module equivalent, called a Virtual Presentation Module (VPM), as shown in FIG. 22. Like its counterpart the VCM, the VPM is implemented as a library or code routine which is used by the Presentation Manager, implemented as a software framework, in order to accomplish the tasks of Normalization and Accumulation.

5. Message Recognition

Figure 23:
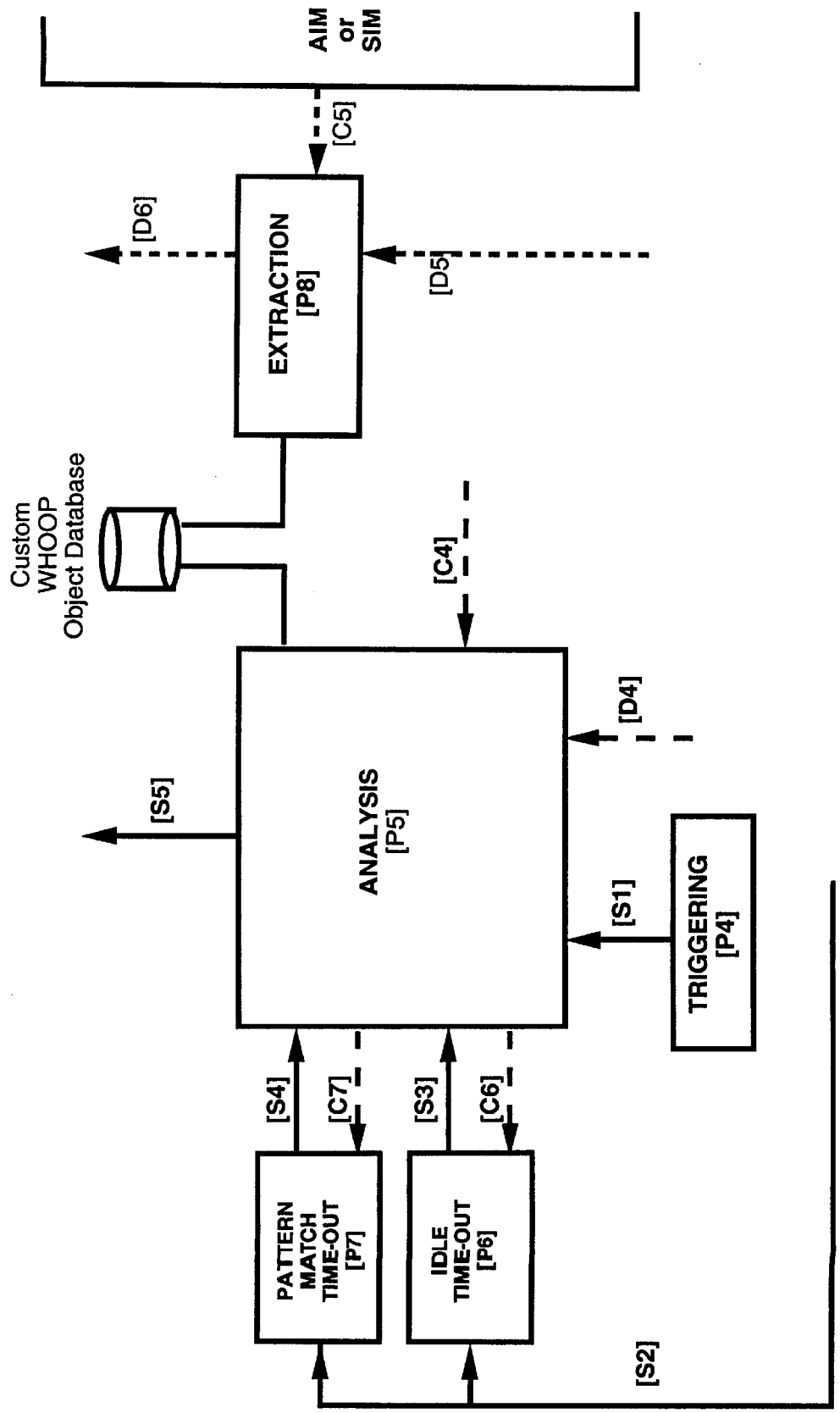
FIG. 23 is a modification of FIG. 3 of the '137 patent showing the use of the custom object database used by the WHOOP to perform analysis of data received.

Essential to a middleware framework that supports the concepts of loosely coupled and asynchronous/non-blocking is the ability to recognize the nature or the meaning of a message, a process which is described as the Analysis and Decision in the '137 patent. Discussed in that patent is the use of an object database containing information required by the Analysis and Decision process of the Messaging and Transaction Manager (the WHOOP). FIG. 23 herein is a modification of FIG. 3 of the '137 patent showing a WHOOP object database in the detailed context with the Analysis module P5 and the Extraction module 8.

In this database, the developer stores information used by the WHOOP to analyze, decide and provide data extraction on the data in the normalized buffers. This database is intended to provide complete independence at the AIM or SIM from the messaging system used by the remote applications. Any change to the messaging system from and to the remote host application may require changes to some objects in the WHOOP database, but in most cases it will not require any changes to the AIM or SIM themselves. The changes to the WHOOP database do not require any complex expertise and are relatively simple to make using graphical tools.

The storage of all message-dependent information in a separate database is essential to a loosely coupled distributed system. As set out in the introduction above, a loosely coupled system implies the ability to replace a remote host system without modifying any existing module. All that is required is the replacement of the objects in the database with a new set that reflect the new messaging system. Since the analysis process uses the information in this database to generate events to the AIM or SIM, and since these events are independent of the messaging system, once the database is modified, the AIM or the SIM will know nothing of the changes to the remote applications.

Custom Objects

The custom objects created by the system developer and stored in the WHOOP database include but are not limited to:

(a) Information required by the WHOOP to recognize a specific message, such as a pattern match and called a pattern object.

(b) Information required by the WHOOP as to the state of a remote application from the context in which the messages have been received. Many remote systems send a common message to indicate that a state transition has been completed, but without indicating the result of this transition. This common message does not contain any information of the new state of the host system, but this information is essential to an AIM or a SIM in order to synchronize its operation. The WHOOP must be able to determine this from the message history in order to maintain a loosely coupled connection between the AIM, SIM and the remote systems. This object is called a GROUP and is created and maintained in the WHOOP database.

(c) Information required by the WHOOP to extract data from the normalized buffers and create a message to a remote system from data provided by the AIM or the SIM. These objects are intended to encapsulate the data from the AIM or the SIM in order to communicate it to and from the remote host applications. This object provide a complex mapping to and from the AIM/SIM data containers to the normalized data buffers and is called Container Mapping or in short, cMAPs.

(d) Encapsulate network dependent data (such as addressing system) from the AIM and SIM by using an indirection to this information through the WHOOP database. Commonly this information is a string and the objects stored are called String Objects.

(e) It was discussed above that the normalized data buffers are actually three dimensional buffers, where the third dimension represents an attribute, such as color, of the character stored in the buffer. In order to determine such attributes, but without requiring the AIM/SIM to have any dependency on the location of such information in the normalized buffer, objects in the WHOOP database, called MASKs, are used.

(f) When a certain state or message is recognized by the WHOOP, a response may be returned to the remote host by the AIM/SIM upon receiving the event generated by the WHOOP. In many cases the response is automatic and does not require any intelligence provided by the code in the AIM/SIM. In such cases the response may be stored in the WHOOP database via an object called a HANDLER object.

(g) Information from the AIM/SIM addressed to a remote host application requires generation of specific messages based on the remote host application messaging semantic which is not known to the AIM/SIM—otherwise there is not a loosely coupled system. How to create a message in order to address it to the remote host application is typically known to the Virtual Presentation Module, but in a complex messaging system the AIM/SIM must be able to indicate what message is to be generated by the VPM. This is achieved by providing a set of objects in the WHOOP database which contain information, called the frame, based on which the VPM constructs the message to the remote application.

6. Message Recognition Failures.

The process of developing an integrated system from a variety of remote host applications requires the population of the WHOOP database with all of the objects required to manage and monitor all possible messages from all the remote systems. Even in the base case where all possible messages are known, any unpredictable network or underlying operating system of the remote host application may introduce messages into the system which have not been anticipated. It is more common, however, that most remote applications are not completely documented for all possible system variations. Rare, undocumented messages, indicating extreme conditions, are almost never documented. The middleware designed to interact with such a system must have complete knowledge of all possible messages to and from such a system and a complete understanding of all possible system states of the remote system. Any system will fail if such is not the case.

That is, for an integrated system to succeed, a complete knowledge of all system states and all possible messages generated by any module in the system must be known in advance, but such is not the case in practice. Although extensive testing is usually done in order to detect as many such undocumented events as possible, many such events may not be discovered in the testing period because of the rarity of their occurrence. As result, it is anticipated that a production distributed system will fail whenever such a rare event occurs.

Figure 24:
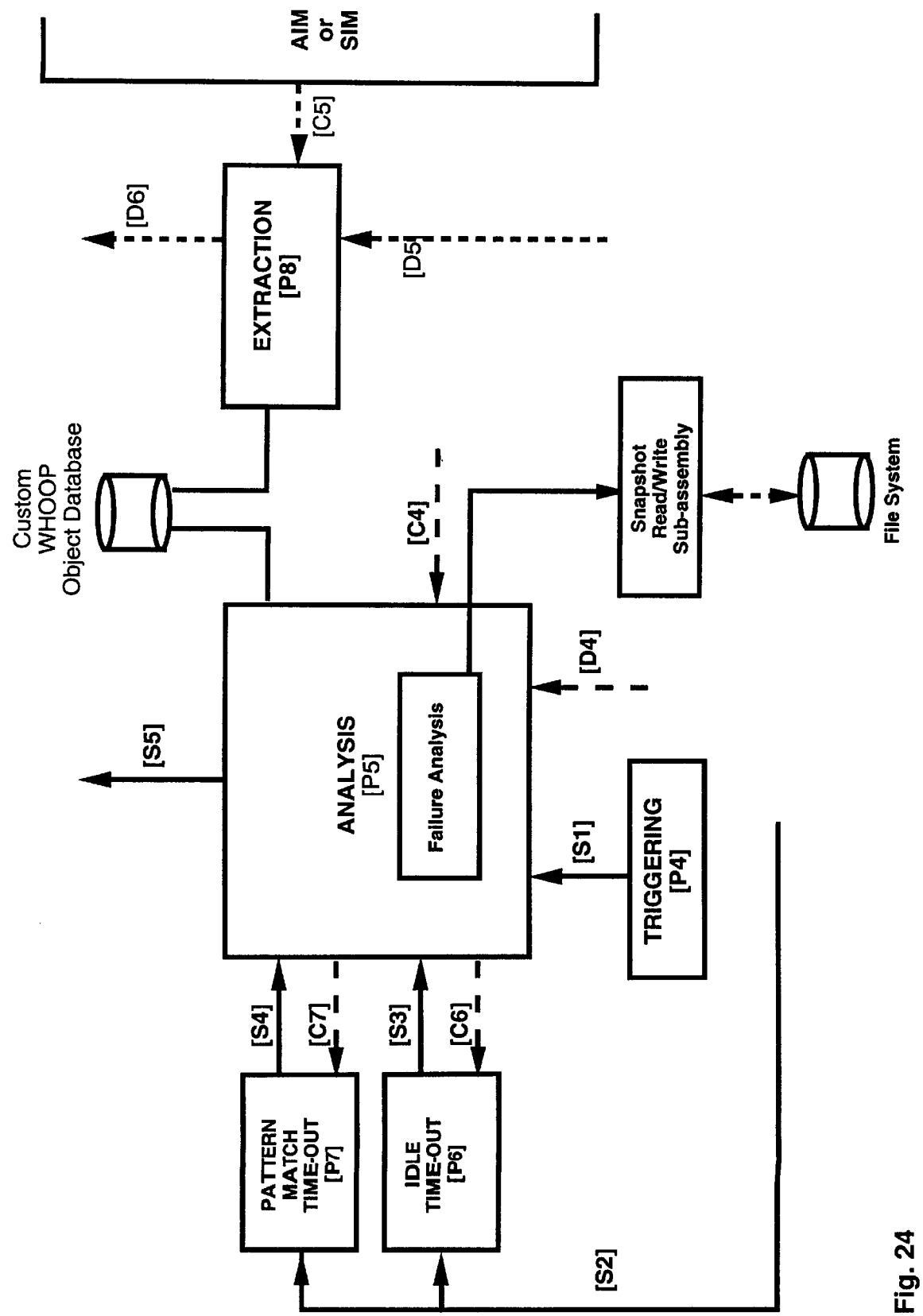
FIG. 24 illustrates the relationship of the Failure Analysis and the Snapshot Read/Write Sub-assembly among the elements of the invention presented in FIG. 3 of the '137 patent and FIG. 23 herein.

As described in the '137 patent, an Idle Time-Out mechanism is provided to the WHOOP in order to determine the occurrence of an undocumented event. Although an evasive maneuver may be taken at that time in order to return to a known state, the occurrence of this event must be documented so that a permanent solution may be achieved. Since the WHOOP can determine that such an event occurred and generate a specific event to the AIM/SIM, the developer now has the ability to implement an event handler in the code that in turn orders the WHOOP to generate a snapshot file, as shown in FIG. 24. FIG. 24 shows the relationship of the Failure Analysis and the Snapshot Read/Write sub-assembly among the elements of the invention presented in FIG. 3 of the '137 patent and in FIG. 23 herein.

This snapshot file contains information needed by a developer to analyze and develop WHOOP database objects required to uniquely recognize such a state. Often, no code changes need to take place, with the exception of those made to the database. By this method the undocumented events may be recorded, analyzed and resolved at any time after the system goes into production and without requiring an extensive testing period.

7. Middleware Functionality

The present invention has at its core a software framework which is used to build a middleware product. The middleware is classified as either bridges, which do not typically modify messages, or gateways, which do modify messages. This framework has the ability to monitor for messages and to interpret them using specialized information contained in an external object database.

Figure 25:
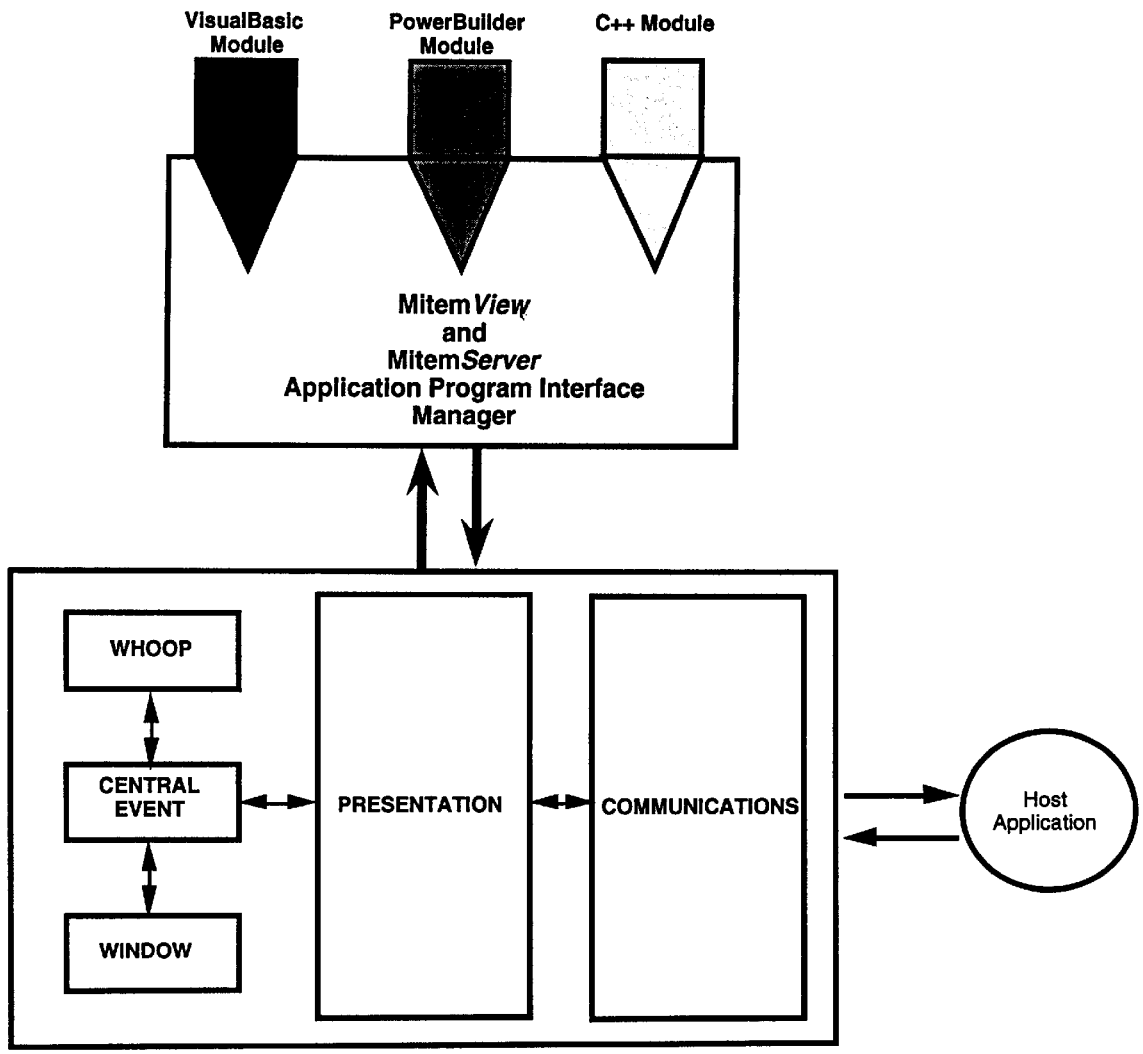
FIG. 25 illustrates the position of the Application Program Interface Manager among the other sub-assemblies.

The desired functionality, however, cannot be implemented within the framework—it must be provided by the developers. This functionality depends on the desired middleware product considered. Such functionality is made available to the framework as library functions implemented in a variety of programming languages. The '137 patent demonstrates such a library implemented in HyperCard. In order to accommodate any language and programming environment, the present framework has an Application Program Interface (API) manager, which resembles the functionality of the VPM and VCM, as seen in FIG. 25. FIG. 25 shows the position of the Application Program Interface Manager among the other sub-assemblies. Like the other MitemView managers, its role is to support a set of custom modules permitting access to MitemView's functions from different programmer development languages.

Figure 19:
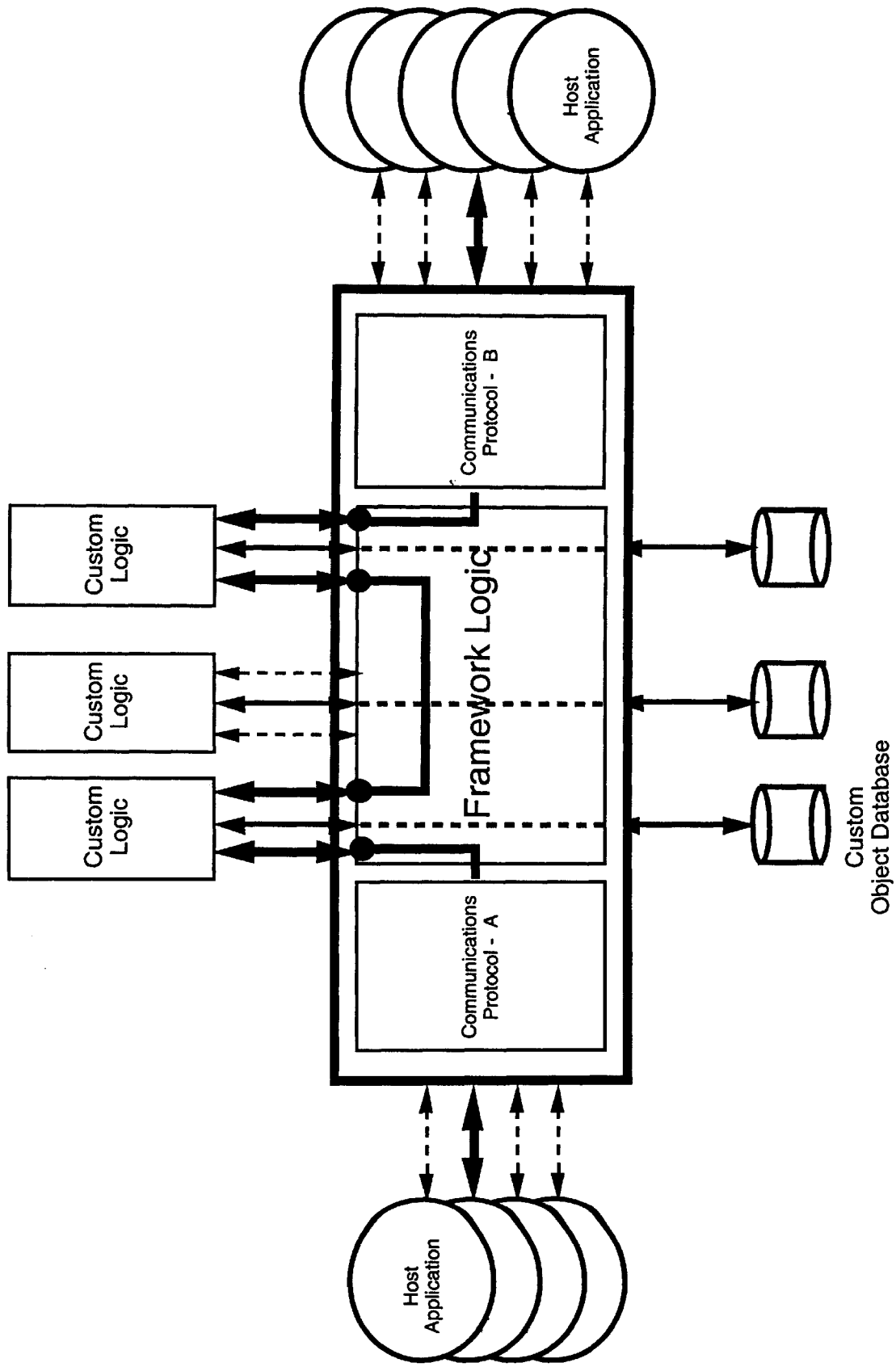
FIG. 19 shows how the elements of FIG. 18 integrate into the server technology by providing equivalent services to the MitemView framework and custom logic modules with custom object databases.

The end result of this architecture is to permit development of custom code modules, in a variety of development languages, which are used in a simultaneous, asychronous and non-blocking mode. Specific to this invention is the ability to transfer session ownership from one AIM/SIM module to any other without disruption to the overall system, as shown in FIG. 19.

8. Filters

Figure 26:
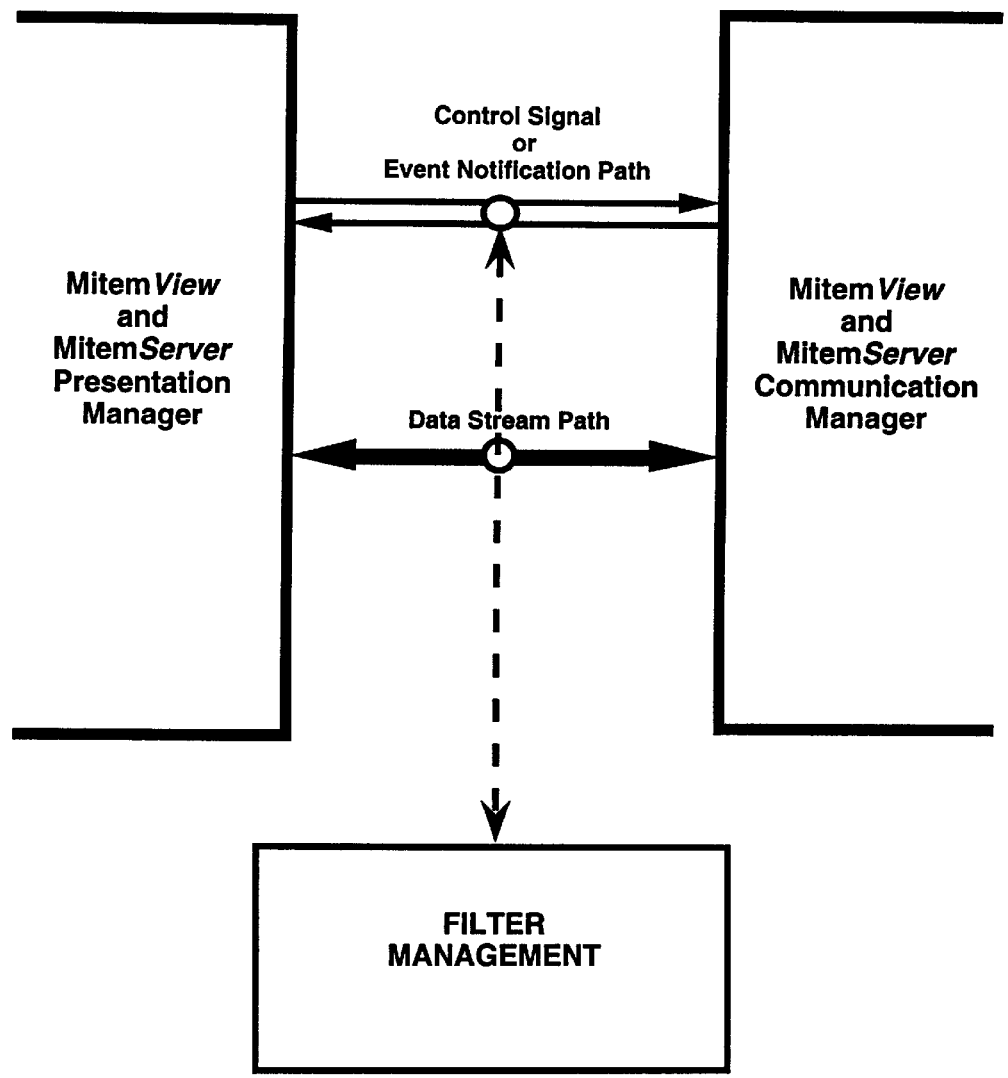
FIG. 26 shows the position of the Filter Management sub-assembly between the Virtual Presentation Manager and the Virtual Communication Manager.

In many situations, the data stream between different parts of the middleware framework may need to be monitored, modified or redirected by a Filter Management ability in such a way that does not affect overall functionality, as seen in FIG. 26. FIG. 26 shows the location of the Filter Management sub-assembly in the data stream path and the control signal or event notification path between the Virtual Presentation Manager and the Virtual Communication Manager. For example, the data stream between the VCM and the VPM for a specific session may require being saved as a data file. This file may be accessed at a later time with the goal of reconstructing (playback) the data movement between different remote parts of the distributed application. The goal for this playback is to reconstruct the activity in as accurate a mode as possible such that the VPM itself is not aware that the data is received from a playback file with no remote host activity at all.

Further Description of Preferred Embodiment

Figure 12:
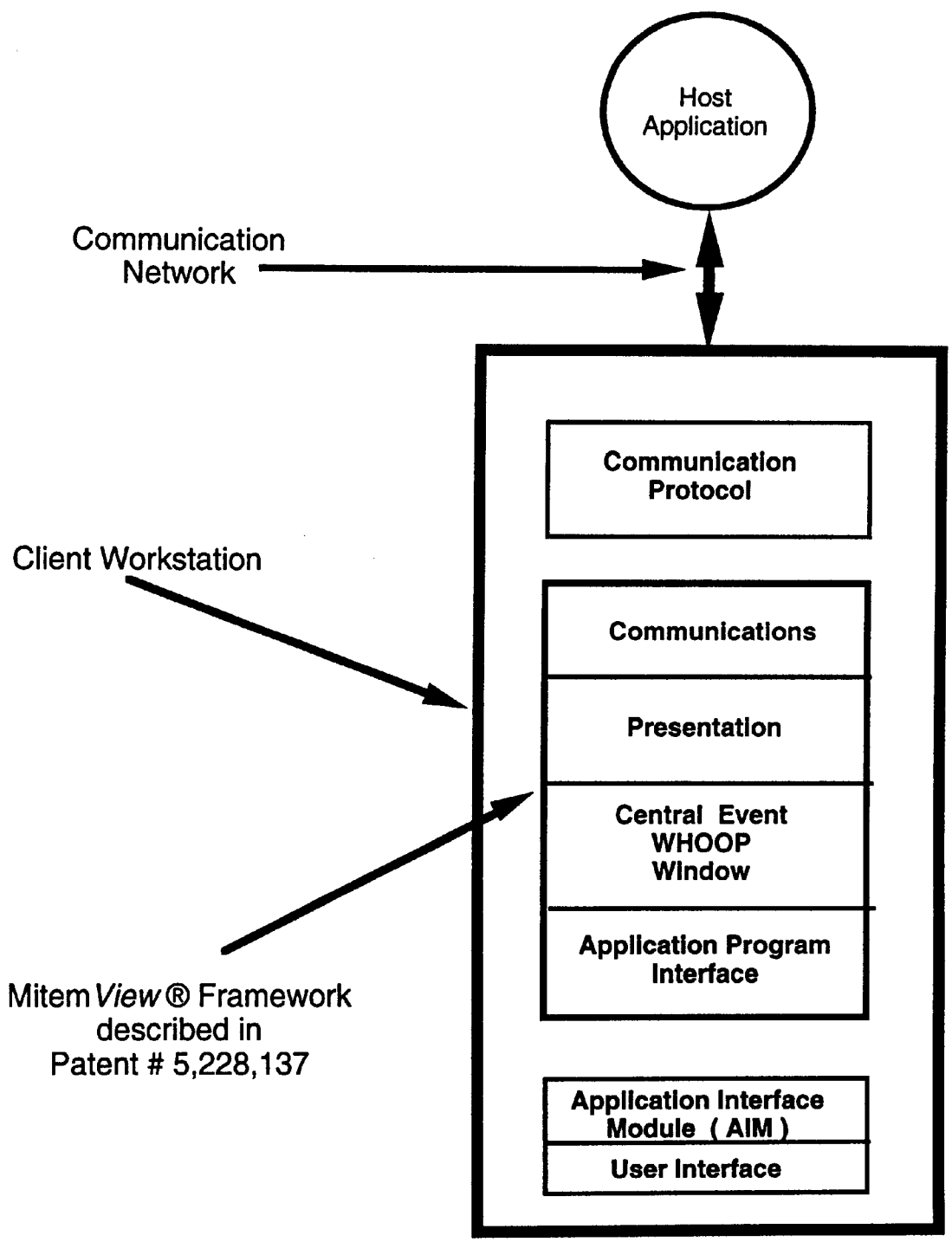
FIG. 12 represents an extension of FIG. 15 of the '137 patent showing the addition of the Communication Protocol subservice and the splitting the of Application Interface Module into two subservices: the AIM Logic and the User Interface.

FIG. 12 is an extension of FIG. 15 of the '137 patent which includes adding the Communication Protocol subservice and splitting the Application Interface Module (AIM) into two subservices: the AIM Logic and the User Interface. This extension is supplied in order to explain the role of the subservices in the case of Mitem Server technology.

Figure 13:
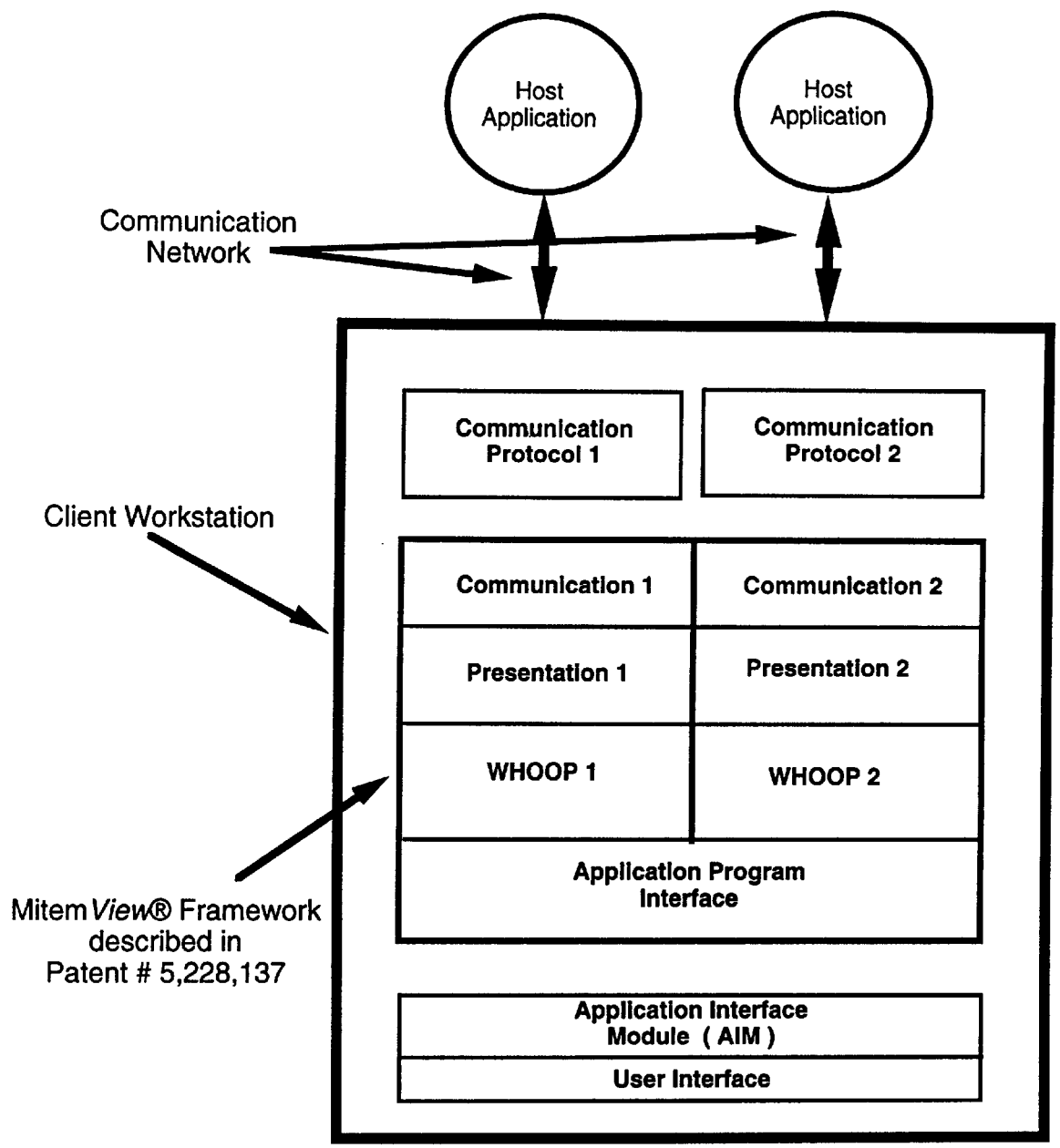
FIG. 13 is the equivalent of FIG. 12 or FIG. 15 of the '137 patent showing how an Application Interface Module integrates two remote systems.

FIG. 13 is the equivalent of FIG. 12 or FIG. 15 of the '137 patent showing how an AIM integrates a remote system. In this case, two dissimilar communications protocols may be present: two communications modules managed by the MitemView Communication Manager, and two presentation modules each with its own instance of the WHOOP module and two different windows (not shown here, but shown in FIG. 15 of the '137 patent. Only one Application Interface Module is required, since both these sessions are integrated into one AIM with one user interface.

FIG. 14 is similar to FIG. 13, but illustrates the use of the present Mitem Server technology. In this case, however, the presence of several Application Program Interfaces will be noted, which permits the use of multiple independent SIMs. Different sessions may need to be exchanged between different SIMs in order to accomplish the required integration. Also, a SIM may or may not have a user interface and in the case where a user interface is present, it is only to provide access to a system administrator. Finally, the server technology treats the client application as if it is just another remote application.

FIG. 15 shows a simplified diagram of a generic Gateway System comprising a Host, or Server Application, and a Client Application. The gateway logic permits the two sides of the system to communicate with each other, although each uses a different messaging system and communication protocol. The gateway logic must be aware of each side's requirements in order to accomplish its task. Such logic tends to be rigid, in the sense that any change to the system may require rewriting the gateway logic. This prevents easy migrations of any parts of the system and also prevents the addition of a new module (remote application) into the system which does not already use a communication dialect already implemented into the gateway logic. (Such a system is called a tightly coupled system).

All the information that is required to communicate with a remote application (dependent information) is embedded in a separate object database. This information may be used both by the gateway framework and by the custom logic. By externalizing such dependent information, one may be able to modify only the database in the case of a change to the remote application, without requiring any changes to the custom code by way of the services provided by the WHOOP. This encapsulation of the dependent information into a separate database, and the services provided by the WHOOP are described in detail in the '137 patent.

FIG. 20 illustrates the architecture of the Virtual Communication Manager sub-assembly and the role played by another set of custom modules called Virtual Communications Modules.

FIG. 21 is a diagram showing the two communications channels between the Virtual Communication Manager and the Virtual Presentation Manager sub-assemblies. The role of these channels, Data Stream Path and Control Signal and Event Notification Path, were also described above.

The central role played by the Virtual Presentation Manager (VPM) is diagramatically shown in FIG. 22. At the crossroad between the Virtual Communication Manager, the WHOOP and the Window Manager, the main function of the Presentation Manager is to normalize data and control signals. This is achieved by the use of yet another set of custom modules called Virtual Presentation Modules (VPM). This is also discussed above. The role of a triggering sub-assembly in normalizing control signals is discussed in the '137 patent.

Example of Normalization of Virtual Presentation Module (HTTP/MIME Module)

Introduction

FIG. 6 shows a typical use of the MitemServer in the context of integrating the WEB world with legacy systems and any other remote host applications. The HTTP/MIME module, which is described below, is the logical equivalent of the 3270 or VT420 modules and is an example of how to employ "screen scraping" technology in data stream transactions. MitemWeb is a Server Interface Module that provides the functionality of a Web server using only the MitemServer services. HTTP/MIME sessions are exchanged between different SIMs in order to accomplish integration.

The MitemView Hypertext Transfer Protocol (HTTP) presentation option enables MitemView developers to integrate end user services based on HTTP with traditional legacy system applications. Thus, legacy systems may be accessed using a standard Web browser. The MitemView HTTP option operates on the same principles as the MitemView IBM 3278 presentation option t3278. However, unlike MitemView's traditional IBM 3270 or DEC VT420 presentation options, the MitemView HTTP presentation option is not intended to be used to directly interact with a remote application. This portion of the application discusses the unique features of the MitemView HTTP presentation option, and how these features differ from other MitemView presentation options.

Receiving Messages

A Web client, such as a browser, sends HTTP requests which are processed by the HTTP module. A complete understanding of the HTTP message format is not required to use the MitemView HTTP option, but a quick review is useful. An incoming HTTP message typically consists of a header and an optional body. The header of the message contains a banner and a list of message descriptors. The body of the message contains the message content. The header is separated from the body by 2 new lines (ASCII value 0x0D followed by 0x0A) denoted by <crlf> in HTTP examples throughout the rest of this document. The body of the message, if present, is also terminated by 2 consecutive newlines.

The HTTP header consists of ASCII values between 0x20 (space) and 0x7E (tilde). Newlines are used to separate message descriptors. Any characters outside this range in the body of the message must be converted to an ASCII sequence of the form %XX. For example, a character of hex value 0x1F would be converted to ASCII sequence: %1F. Thus, any byte value may be sent in the body of the message. Typically, the banner or first line of the header consists of three fields, each separated by a single space. The banner itself is terminated by a newline. The three fields of the banner are the message type, the Universal Resource Locator (URL), and the protocol. Following are some examples of the banner:

GET / folder2/folder2/test.htm HTTP/1.0<crlf> or

POST / AS400/Demo/request HTTP/1.0<crlf> where the message type is either GET or POST, the URL is either /folder2/folder2/test.htm or /AS400/Demo/request and the version is HTTP/1.0 in both cases.

Following the banner is the rest of the header of the HTTP message consisting of a variable number of descriptor fields. Each descriptor field has a name and data. The name is separated from the data by a ':' (colon) and the data is terminated by a newline. The descriptor field list is terminated by two newlines. Below is an example of a complete HTTP header:

GET /folder2/folder2/test.htm HTTP/1.0<crlf>

Connection: Keep-Alive<crlf>

User-Agent: Mozilla/3.0Gold (Macintosh; I;PPC)<crlf>

Host: 111.22.333.44:10987<crlf>

Accept: image/gif, image/x-bitmap, image/jpeg, */*<crlf>

Accept-Language: en-US, ja<crlf>

<crlf>

The MitemView HTTP presentation processes HTTP header information as follows.

The rest of the header is displayed with each descriptor field on a new line. The descriptor data preferably is displayed in red beginning from a fixed column number in order to make it more readable. If there is more data than can be displayed on the same line, the additional data is preserved in an internal buffer and the character '> in neutral color is displayed in the last column (x,80) of the dMitemView HTTP presentation window.

Although only 30 lines are displayed in the visible window, there is no actual limit to the number of fields accepted by the HTTP presentation. All of these fields are accessible from the MVEdit tools and through the MitemView API, even if they are not visible in the window.

Each slit of this mask is accessed by its name rather than by location. This is significant, since the same HTTP request can be made from a different browser or the same browser on a different hardware platform and cannot be guaranteed to present the HTTP request fields in the same order.

With few exceptions, each slit name in this default mask is the same as its caption. On the banner line there are two slits that do not have a caption name. These slits or fields are in fact defined by MitemView and thus their names are generated by MitemView and are called <u>Name</u> and <u>Protocol</u>.

As with all MitemView masks, the name of each slit may be modified, to the header fields. Unlike the header fields, the captions of these descriptor fields are separated from their respective data by an '=' sign and the data is left justified. Like the header, the slit names are identical to the caption names.

The number of such fields is not limited by the size of the window (currently the number of lines visible in the window is set at 30 lines). If more fields are present than may be accommodated in the window, those are generated and accessible as any other field (including the MVEdit tools), although they are not visible in the window. It is sometimes desirable to combine some of these fields into a list and treat this list as a single field.

GET with parameters

It is common for the browser to generate a GET request with parameters. In such a case, the parameters are attached to the URL following the '?' character. Typically, the parameter is actually a list of HTTP fields (caption=data), where each field is separated from the previous field by the character '&'.

The MitemView HTTP presentation module (HTTP—VPM) upon receiving such a request, removes the parameter list from the URL and automatically creates a new field in the header portion of the request with the caption "Param" and the values equal with the field list contained in the GET request. The "Param" field generated by MitemView, if present, is always placed on the 3 line immediately following the URL, independently of what other fields may be present in the HTTP request. It is always missing if the GET request did not have any parameters.

A GET request with parameters is not different in essence from a POST request except that the parameter list is either attached to the URL (GET with parameters) or is placed in the body of the request (POST with parameters). It is therefore useful to be able to treat both requests in the same way. For this reason, the system provides a new option for MV.CommandTo addressed to the HTTP presentation module in order to convert a GET with parameters to a POST. The following command:

MV.CommandTo device, "presentation", "post"

generates the changes to the HTTP presentation. The "GET" is changed to "POST" and the parameter field is now parsed and placed in the body as if this was a regular POST request.

Data Extraction

MitemView processes HTTP requests using commands and masks as with all other MitemView options. It is recommended that data in HTTP fields be accessed through the default mask. This mask does not need to be created and is assumed by all pertinent MitemView API commands unless otherwise specified.

The two standard MitemView commands used to extract data from a MitemView device buffer, MV.SlitString and MV.FromMask, may be applied, except that the mask name option is an empty string to specify the use of the default mask. For example:

MV.SlitString(device, " ", "Connection")

will return Keep-Alive completely independently of where the slit Connection may be. In order to use MV.FromMask, a Container Map (cMap) must have first have been created. Mask All Unprotected is selected from the Edit Menu in the presentation display window to access the default mask. All slits are automatically named and available through the cMap editor Add Slit option.

Response Messages

A response message is transmitted as a reply to a request. The response message consists of a Header (Banner or Status Line and a Descriptor List) and a Body. MitemView will automatically generate the appropriate response message if instructed to do so by the use of the MV.SendTx().

MITEM discourages the use of other MitemView commands such as MV.TypeString and MV.DataTo for typical Web-based applications.

The banner of the response consists of three space-separated items and terminated by a newline. The three items are:

http_version status code_code textural_explanation<crfl>

The rest of the header consist of a variety of descriptors, which in the case of the default MitemView response, are as follows:

Date: date_time <crlf>
Server: MitemServer/1.0 <crlf>
MIME_version: 1.0 <crlf>
Content_type: text/html <crlf>
Content_length: length <crlf>
Last_modified: date_time <crlf>

For example, a typical header for a position response might be:

HTTP/1.0 200 OK
Date: Sun, 01 Feb 1997 15:53:03 GMT
Server: MitemServer/1.0
MIME_version: 1.0
Content_type: text/html
Content_length: 12345

In most cases there is no need to modify any of the default values generated by MitemView with the exception of the status code. When a different status code is requested by the MitemView developer, the textual explanation that will be sent is still automatically generated, unless expressed otherwise, using the following list:

200, "OK",
201, "Created",
202, "Accepted",
203, "Non-Authoritative Information",
204, "No Content",
205, "Reset Content",
206, "Partial Content",
300, "Multiple Choices",
301, "Moved Permanently",
302, "Moved Temporarily",
303, "See Other",
304, "Not Modified",
305, "Use Proxy",
400, "Bad Request",
401, "Unauthorized",
402, "Payment Required",
403, "Forbidden",
404, "Not Found",
405, "Method Not Allowed",
406, "Not Acceptable",
407, "Proxy Authentication Required",
408, "Request Timeout",
409, "Conflict",
410, "Gone",
411, "Length Required",
412, "Precondition Failed",
413, "Request Entity Too Large",
414, "Request-URI too Long",
415, "Unsupported Media Type",
500, "Internal Server Error",
501, "Not Implemented",
502, "Bad Gateway",
503, "Service Unavailable",
504, "Gateway Timeout",
505, "HTTP Version Not Supported", For any other code not in the list above, MitemView will generate Undefined Reason as the textual explanation In most cases the header will be followed by a body. Typically, the body consists of some textual information or the contents of a binary file. The most common body contents are HTML statements either generated by an application or retrieved from a file.

The only reason to genrate HTML statements on the fly is to present variably formatted information. Since generation of HTML code is cumbersome, slow, and prone to coding mistakes, MitemView provides an internal mechanism to simplify the generation of HTML variable data from a static HTML file. The MV SendTx() command that follows is crucial to this process.

MV.SendTx Command

This command has the following syntax:

MV.SendTx device, messageType, dataobject, options where:

| | |
|---|---|
| Device | A standard parameter for all MitemView commands. |
| MessageType: | The type of message which will be sent to the remote application. Currently the only supported type for this parameter is HTTP Response. |
| DataObject | This is treated differently depending on the messageType and on the choice of options. For the HTTPResponse type the dataObject represents the data that will be transmitted in the HTTP message body. A more detailed discussion of its use in the context of the HTTPResponse follows this command definition. |
| Options | The standard parameter list for all MitemView commands. Its use in the context of the HTTPResponse type will be discussed later. The list of currently accepted options are: status:xxx--replace the default status sent in the message header with xxx. reason:aaa--Replaces the default textual__ explanation parameter with aaa. Note the default textual_explanation is based on the option status value and that there is no dependency on the order of parameters in the option list. cType:ttt--Replaces the default Content_type with ttt. cLen:111--Replaces the default Content_len with 111. file--Specifies that dataObject is the name of a file that need to be transferred in the message body to the response. data--Specifies that dataObject is the actual data to be sent. msgName:--name--defines name as the handler to receive status messages from the file transfer manager. |

The messageType: HTTPResponse is used to generate a HTTP response. The header of the response is generated automatically based on the HTTPResponse template. The current defualt template used looks like:

HTTP/1.0 200 OK
Date: Sun, 01 Feb 1997 15:53:03 GMT
Server: MitemServer/1.0
MIME_version: 1.0
Content_type: text/html
Content_length: 12345

Different default values may be overridden using the option string. Other values may change depending on the dataObject used.

In the context of the HTTPResponse mess age type, the dataObject is:

The name of a data file to be transmitted in the body of the message.

The message body itself.

The default mode is to ignore this parameter. In this case, the default HTML file will be transmitted in the body of the response message. This case will be discussed in more detail in the next section .

If the option data specifies dataobject, the dataobject is considered to be the message body and will be transmitted to the remote system. If no dataobject is present and the data option is used, then only the header of the HTTP respone will be sent. No message body is required in this case, but developers may elect to create the body of the transaction on the fly using the MV.DataTo or MV.TypeString commands.

To indicate that the dataObject represents the name of a file to be transferred to the remote system, specify file in the options list. For example:

MV.SendTx "http_0001", "HTTPResponse", "This is a test", "/strict/data"

will send "This is a test" in the message body, while

Mv.SendTx "http_0001", "HTTPResponse", "/folder1/test.jpg", "/strick/file/..."

will send the JPEG file/folder1/test.jpg.

When sending a data file to a remote system via MV.SendTx, the developer must define handler to receive MitemView file transfer status messages about the progress of the file transfer. The successful transmission of the file will be signaled to this handler. After completion of the file transfer of an HTTP respone, the connection to the remote system must be closed by the status message handler upon receipt of the file completion signal. The following option string is used to specify the name of the this handler:

"/strict/ ... /msgName:httpFileMonitor"

An example of the complete command to transfer a file in the body of an HTTP response is:

MV.SendTx "http_0001", "HTTPResponse", "/folder1/test.jpg", "/strict/file/msgName:httpFileMonitor"

In this case, the header of the HTTPResponse will be automatically modified to reflect the fact that a JPEG file will be sent to the remote system. Assuming that the file/folder1/test.jpg has a size of 105,346 bytes, then the header actually transmitted is:

HTTP/1.0 200 OK
Date: Mon, 02 Feb 1997 09:16:42 GMT
Server: MitemServer/1.0
MIME_version: 1.0
Content_type: pick/jpeg
Content_length: 105346

The MitemView file transfer status message has five parameters as follows:

| Parameter | Name | Usage |
|---|---|---|
| 1 | device | Device that is reporting transfer status |
| 2 | status | =0 Transfer in Progress |
|   |   | =1 Transfer Completed OK |
|   |   | =2 Transfer Aborted |
| 3 | totalChars | The total character count |
| 4 | charCount | Characters transmitted so far |
| 5 | time | Time remaining (total time if the transfer has comleted) |

Defualt HTML File

The typical HTTP body is a set of HTML commands. The HTML commands can be generated on the fly or be from a file previously created with an HTML editor. The second method is recommended, since it does not require knowledge of HTML syntax. It is also easier to maintain since no code needs to be changed when changes to a HTML layout page are required.

Because it is often necessary to customize some information in the HTML file before sending it to the requester, MitemView includes a novel and simple facility that permits embedding commands in the HTML file which MitemView can then substitute on the fly with variable information.

The HTML file may be thought of as equivalent of a 3270 on window. Most of the data in the HTML file may not be ("protected" in 3270 terminology.) "Unprotected" or "input" areas are identified by the use of MVSlit() commands embedded within the source HTML file.

MVSlit(Question) which is recognized by MitemView tools and commands as an input field named "Question".

MVSlit(QText) which is recognized by MitemView tools and commands as the input filed named "QText".

Each MVSlit field is equivalent to a MitemView slit and may be treated as such in the application of MitemView commands and tools. Unlike terminal slits however, each MVSlit can contain an unlimited number of characters. In particular, cMAPS may be defined that reference MVSlits by name to facilitate use of more powerful MitemView commands such as MV.ToMask and MV.TypeMask. The rest of this section explains how this is accomplished.

For the example HTML page presented earlier, one would create a cMAP that utilizes two MitemView layer containers; cl_Question and cl_QText where:

cl_Question contains "What is MitemView ?"

cl_Qtext contains "MitemView" is a great software tool."

The cMAP can then bind the cl_Question container to a slit named Question and the container cl_QText to a slit named Qtext.

After the appropriate HTML file is specified to MitemView, the following command may be used:

MV.ToMask "http_0001", "c_qaResp", " "

where c_qaResp is the cMAP name. This command can then be followed by the command MV.SendTx in order to return HTML commands to the requster.

The MV.SendTx command verifies that all MVSlits were replaced with data before transmitting the HTML file in the body of the response. If the MV.SendTx encounters an MVSlit() that was not replaced, it automatically replaces it with an error string, "* MVSlit Error*".

It is necessary that MitemView know which HTML file is the one being affected by all the commands mentioned earlier. None of these commands apply only to a defualt HTML file. An HTTP device accepts HTML file specifications and each HTTP device may use the same or different HTML defualt files. In the case of several HTTP devices using the same HTML file, modifications to MvSlits apply only to the HTTL file associated with the HTTP device referred to by the current MitemView command.

There are two ways to specify a defualt HTML file for a device: the MV.StateTo command or the MV.ToSlit command. This latter command will be described in detail in the next section.

To specify the default HTML file for a given HTTP session, the following command is used:

MV.StateTo "http_0001, "pres", "[strict] load:

c:\apps32\MVweb\home|q&aResp. htm"

where the option load takes as a parameter the HTML file name and is applied to the Presentation Manager. Note the use of the char. '[' as an option separator in order to permit the use of '[' as a file path separator.

Once defined, the HTML default file remains active until specifically changed with another MV.StateTo or MV.To Slit command. Commands such as MV.ToMask, MV.TypeMask, MV.ToSlit and MV.SendTx all use the default HTML file as their target. Only MvSlits present in this file are recognized by these commands, and references to an MVSlit not defined in this file will result in an error.

One can intepret the default HTML file as if it were an extension of a 3270 input screen. The command MV.SendTx acts as the enter key for the 3270 screen. MV.ToSlit acts like MV.TypeString on a 3270 screen. MvToMask and MV.Type-Mask provide equivalent functionality in either case.

MV.ToSlit Command

In the previous sections the concept of an MVSlit in the context of an HTML data file was introduced. The conceptual similarity between an input field in 3270 presentation window and an MVSlit is emphasized. More simply stated, a MvSlit is defined to be a named slit in a defualt mask which is associated with the HTML file in the same way a default mask is associated with the HTTP Request.

The HTTP and HTML default masks permit the application of many MitemView commands to the Internet environment. However, MV.TypeString cannot be used in this context since there is no equivalent to a cursor in the HTTP/HTML environment.

A new MitemView command is introduced to address some of the application needs that were addressed by the use of the MV.TypeString command. This new command, called Mv.ToSlit, combines and generalizes the functionality of MV.CursorTo and MV.TypeString within the same command. In this 3270 environment, in order to put some data using Mv.TypeString, one must move the cursor to a given slit using MV.CursorTo.

This command has the following syntax:

MV.ToSlit device, maskName, slitName, dateobject, option device—A standard parameter for all MitemView commands. In this case it may be thought as a pointer to the default HTML file associated with this device.

maskName—In the case of HTTP device this parameter is ignored and only the default mask is assumed.

slitName—The slip or MVSlit name.

dataobject—Data to be placed at the location specified by slitName (see above)

options—A standard parameter for all MitemView commands. There are no options defined at this time.

It is important to note that neither the MV.ToSlit, nor MV.TypeMask nor MV.ToMask, affect MVSlit() definitions. These functions place data at the locations in the HTML instance where an MVSlit() is defined in the defualt HTML file, but do not affect the default HTML itself. Repeated reference to the same MVSlit() will replace the prior MVSlit substitution with the latest.

MitemView HTML Embedded Commands

There are two way to control the behavior of the HTTP/MIMI presentation module. One method, the traditional method, is to send API commands and state changes to the presentation manger. This method is discussed in more detail elsewhere.

The other method which is unique to the HTTP/MIME presentation module, consists of embedding special commands within the body of HTML files. Such commands either affect the data that is sent to the remote system (MVSlit() command) or how the data received should be interpreted by the HTTP/MIME presentation.

The command syntax for these commands was chosen such that they would not affect the behavior of any other Internet/Intranet elements that use HTML files: applications such as Browsers, WEB Servers, HTML Editors, etc. These commands should not be confused with the more common HTML tags. The generic MitemView embedded command consists of a name for the command, which is always preceded by "MV". The name is always followed by a list of parameters enclosed by parentheses. These parameter list depends on the type of commands:

MVSomeCommand ( param1, param2 . . . )

The embedded commands are supported:

MvSlit()

MVList ( options )

MVEnd()

The MVSlit() command defines a variable output field within the HTML file and is discussed in detail above. MVList() and MvEnd() commands are interpreted by the HTTP/MIME presentation module upon receiving fields data from a POST, or GET with parameters requests.

I claim:

1. A method for controlling simultaneous execution of one or more computer application programs in one or more host computer systems under control of a second computer system which may be remote from the one or more host computer systems, where said computer application programs may be dissimilar to each other, and said host computer systems may be dissimilar to each other, said host computer systems generating presentation information based on said application programs or on generic computer messages, or both, said method employing a programming framework for building customized gateways for said application programs;

said method comprising the steps of:
establishing a plurality of relevant selected parameters in said host computer presentation information;
said relevant selected parameters having a variable time of occurrence and context in said presentation information;
interpreting selected portions of said host computer systems' presentation information in said application program being executed; and
executing one or more of said application programs under the control of said second computer system through a customized gateway on the basis of said interpreted presentation information, said gateway utilizing an external object database to provide information for customizing said gateway.

2. A method in accordance with claim 1 including the step of recognizing the type and meaning of any message received from any said computer application program, and derived from said presentation information, on the basis of custom data objects maintained in said object database.

3. A method in accordance with claim 2 including the step of responding to any received message with a custom message based on custom data objects maintained in said object database without necessarily requiring action from an application program.

4. A method in accordance with claim 1 including the step of parsing and encapsulating any data chunk of any message received from any said application program based on custom data objects maintained in said object database.

5. A method in accordance with claim 1 including the step of assembling custom messages to be sent to one of said application programs based on custom data objects maintained in said object database and on data chunks collected from other messages or from data objects maintained and preserved in said object database or acquired from an application program.

6. A method in accordance with claim 1 including the step of controlling the execution of a remote application program from said customized gateway to restore determinism based on custom data objects maintained in said object database without necessarily requiring action from an application program.

7. A method in accordance with claim 1 including the step of utilizing an application program interface and local program callback for creating controlling programs and specialized code residing on the same second computer system as said gateway to customize said gateway.

8. A method in accordance with claim 1 including the step of utilizing a remote application program interface and remote program callback for creating at least one controlling application program and specialized code residing on a remote computer to customize said gateway.

9. A method in accordance with claim 8 including the step of creating said controlling application program and customized code in any desired computer language or any application development framework.

10. A method in accordance with claim 8 including the step of maintaining, preserving and executing framework customizing code fragments from said object database without necessarily requiring action from said controlling application program.

11. A method in accordance with claim 8 including the step of storing the pertinent state and data of the framework from an ongoing session with a remote system in a data file for further analysis, said pertinent state and data including communication channel state and data, state and presentation buffers data, state and data of a message monitor, and a log of transactions with said controlling application.

12. A method in accordance with claim 11 including the step of restoring the framework state with data from a previously saved state and data file for analysis and maintenance.

13. A method in accordance with claim 1 including the step of permitting custom binary data transfer and file transfer to and from a remote file transfer application program.

14. A method in accordance with claim 1 including the step of logging and recording network data transfer to and from a remote application program and saving it to a data file.

15. A method in accordance with claim 1 including the step of playing back a pre-recorded network data file to simulate the activity of a remote host application program even when the original application program is not available.

16. A method in accordance with claim 1 including the step of logging and recording message buffering to and from a host application program and saving it to a data file.

17. A method in accordance with claim 1 including the step of playing back a pre-recorded message buffering data file in order to simulate the activity of a remote host application program even when the original application is not available.

18. A method in accordance with claim 1 including the step of browsing data from said object database containing all the information used to customize said gateway.

19. A method in accordance with claim 1 including the step of creating and modifying data from said object database containing all the information used to customize said gateway.

20. A method in accordance with claim 1 including the step of converting data from said object database used to customize said gateway framework to a textual data file that may be accessed by a text editing program.

21. A method in accordance with claim 1 including the step of expressing the data from said external object database used to customize said gateway to a textual data file that may be accessed by a text editing program.

22. A method in accordance with claim 1 including the step of converting a textually expressed data file to said object database used to customize said gateway.

23. A method in accordance with claim 1 including the step of processing and buffering hypertext transfer protocol messages to a format that can be used by said customized gateway to communicate with standard WEB Browsers in the same way said gateway communicates with other remote application programs.

24. A method in accordance with claim 1 including the step of using textual tags to customize textual files with variable data prior to being sent to one of said application programs.

25. A method in accordance with claim 24 including the step of modifying said textual tags imbedded into said textual file.

26. A method in accordance with claim 1 in which said customized gateway controls the exchange of information between different ones of said application programs being executed on different ones of said host computer systems.

27. A method in accordance with claim 1 in which said customized gateway converts a message of a first type from one of said host computer systems to a message of a second type for use by a second one of said host computer systems.

28. A method in accordance with claim 1 including the step of buffering at least a portion of said presentation information in a three dimensional presentation data buffer.

29. A method in accordance with claim 28 including the step of processing messages in said presentation buffer based on custom data objects maintained in said external object database.

30. A method for constructing custom application program gateways to enable execution of computer application programs in one or more host computer systems under control of a second computer system, host computer system generating presentation information based on the application programs or on generic computer messages, said method comprising the steps of:

establishing a plurality of relevant selected parameters in said host computer presentation information;

said relevant selected parameters having a variable time of occurrence and context in said presentation information;

interpreting selected portions of said host computer system's presentation information in said application programs being executed;

establishing an external object database; and supplying said external object database with custom data objects for customizing said application program gateways.

* * * * *